US 6,687,360 B2

(12) United States Patent
Kung et al.

(10) Patent No.: US 6,687,360 B2
(45) Date of Patent: Feb. 3, 2004

(54) PERSONAL IP FOLLOW-ME SERVICE

(75) Inventors: Fen-Chung Kung, Bridgewater, NJ (US); Jesse Eugene Russell, Piscataway, NJ (US); Anish Sankalia, Iselin, NJ (US); Hopeton S Walker, Haledon, NJ (US); Spencer C. Wang, Parsippany, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/475,747

(22) Filed: Dec. 30, 1999

(65) Prior Publication Data

US 2003/0108176 A1 Jun. 12, 2003

(51) Int. Cl.⁷ ................................................ H04M 3/42
(52) U.S. Cl. ............................ 379/211.02; 379/211.01
(58) Field of Search ...................... 379/211.01, 211.02

(56) References Cited

U.S. PATENT DOCUMENTS

| 4,922,529 A | 5/1990 | Kiel ............................ 379/377 |
| 4,995,074 A | 2/1991 | Goldman et al. ......... 379/93.35 |
| 5,253,341 A | 10/1993 | Rozmanith et al. .......... 709/219 |
| 5,274,700 A | 12/1993 | Gechter et al. ......... 379/211.01 |
| 5,276,731 A | 1/1994 | Arbel et al. ............ 379/211.02 |
| 5,363,431 A | 11/1994 | Schull et al. ............ 379/88.12 |
| 5,375,161 A | 12/1994 | Fuller et al. ................. 455/417 |
| 5,428,608 A | 6/1995 | Freeman et al. ............ 370/261 |
| 5,479,411 A | 12/1995 | Klein ...................... 379/88.13 |
| 5,483,588 A | 1/1996 | Eaton et al. ........... 379/202.01 |
| 5,533,110 A | 7/1996 | Pinard et al. .......... 379/355.01 |
| 5,610,910 A | 3/1997 | Focsaneanu et al. ..... 370/351.1 |
| 5,612,997 A | 3/1997 | Vallelonga, Sr. et al. ... 379/393 |
| 5,652,789 A | 7/1997 | Miner et al. ........... 379/201.01 |
| 5,706,342 A | 1/1998 | Baeder et al. .............. 379/382 |
| 5,708,961 A | 1/1998 | Hylton et al. ................. 725/81 |
| 5,712,907 A | 1/1998 | Wegner et al. ......... 379/114.02 |
| 5,724,412 A | 3/1998 | Srinivasan ................ 379/93.23 |
| 5,742,596 A | 4/1998 | Baratz et al. ................ 370/356 |
| 5,742,905 A | 4/1998 | Pepe et al. ................... 455/461 |
| 5,751,706 A | 5/1998 | Land et al. .................. 370/352 |
| 5,751,760 A * | 5/1998 | Fuller et al. ............ 379/207.13 |
| 5,768,513 A | 6/1998 | Kuthyar et al. ............. 709/204 |
| 5,796,952 A | 8/1998 | Davis et al. ................. 709/224 |
| 5,805,587 A | 9/1998 | Norris et al. ................ 370/352 |
| 5,809,128 A | 9/1998 | McMullin .............. 379/215.01 |

(List continued on next page.)

FOREIGN PATENT DOCUMENTS

| AU | 59680/98 | 9/1998 |
| EP | 0 794 643 A2 | 9/1997 |
| EP | 0 800 325 A2 | 10/1997 |

(List continued on next page.)

OTHER PUBLICATIONS

Justin J. Junkus, "Cable Telephony's Oxymoron", Communication Technology, Aug. 1999, pp. 24–26.

Evan Bass, "IP Telephony: The Race Heats Up—Vendors, Start Your Engines", Communications Technology, Aug. 1999, pp. 48–50 & 52–55.

Justin J. Junkus, "SuperComm Highlights IP Telephony", Communication Technology, Aug. 1999, pp. 72, 74, 76, 78, 79.

(List continued on next page.)

*Primary Examiner*—Ahmad F. Matar
*Assistant Examiner*—Quynh H. Nguyen

(57) ABSTRACT

A method and system for providing a dynamic call forwarding service for a subscriber in an IP telephone network is disclosed. When a predetermined telephone number is called from a telephone other than the subscriber's home telephone, the subscriber enters a code for location registration. The directory number of the telephone the subscriber is using is determined for location registration. A call for the subscriber's home telephone is then routed to the telephone the subscriber used for location registration.

6 Claims, 8 Drawing Sheets

U.S. PATENT DOCUMENTS

| | | | |
|---|---|---|---|
| 5,870,565 A | | 2/1999 | Glitho .......................... 709/249 |
| 5,887,259 A | * | 3/1999 | Zicker et al. ................ 455/426 |
| 5,894,504 A | | 4/1999 | Alfred et al. ............. 379/88.13 |
| 5,896,444 A | | 4/1999 | Perlman et al. ........... 379/93.35 |
| 5,916,302 A | | 6/1999 | Dunn et al. .................. 709/204 |
| 5,920,705 A | | 7/1999 | Lyon et al. .................. 709/240 |
| 5,923,731 A | | 7/1999 | McClure ...................... 379/33 |
| 5,946,381 A | | 8/1999 | Danne et al. ........... 379/142.07 |
| 5,946,386 A | | 8/1999 | Rogers et al. .......... 379/265.09 |
| 5,987,508 A | | 11/1999 | Agraharam et al. ........ 709/217 |
| 5,999,525 A | | 12/1999 | Krishnaswamy et al. ... 370/352 |
| 5,999,612 A | | 12/1999 | Dunn et al. ............. 379/212.01 |
| 6,011,909 A | | 1/2000 | Newlin et al. ............... 709/227 |
| 6,046,790 A | * | 4/2000 | Hara et al. ................... 349/172 |
| 6,104,800 A | | 8/2000 | Benson .................. 379/215.01 |
| 6,172,661 B1 | * | 1/2001 | Imajo et al. ................... 345/89 |
| 6,233,235 B1 | * | 5/2001 | Burke et al. ................. 370/356 |
| 6,263,065 B1 | | 7/2001 | Durinovic-Johri et al. ...................... 379/266.03 |
| 6,438,222 B1 | | 8/2002 | Burg ...................... 379/215.01 |
| 6,442,266 B1 | | 8/2002 | Wu ........................ 379/211.02 |

FOREIGN PATENT DOCUMENTS

| | | |
|---|---|---|
| EP | 0 758 175 A1 | 12/1997 |
| EP | 0 856 981 A2 | 8/1998 |
| EP | 0 905 959 A2 | 3/1999 |
| WO | WO 95/18501 | 7/1995 |
| WO | WO 97/14238 | 4/1997 |
| WO | WO 97/16007 | 5/1997 |
| WO | WO 97/37483 | 10/1997 |
| WO | WO 97/46073 | 12/1997 |
| WO | WO 97/47118 | 12/1997 |
| WO | WO 97/47119 | 12/1997 |
| WO | WO 97/47127 | 12/1997 |
| WO | WO 98/01985 | 1/1998 |
| WO | WO 98/07266 | 2/1998 |
| WO | WO 98/19240 | 5/1998 |
| WO | WO 98/19448 | 5/1998 |
| WO | WO 98/19471 | 5/1998 |
| WO | WO 98/24224 | 6/1998 |
| WO | WO 98/30002 | 7/1998 |
| WO | WO 98/36551 | 8/1998 |
| WO | WO 98/51063 | 11/1998 |
| WO | WO 98/52332 | 11/1998 |
| WO | WO 98/52339 | 11/1998 |
| WO | WO 98/53617 | 11/1998 |
| WO | WO 98/54871 | 12/1998 |
| WO | WO 99/14924 | 3/1999 |
| WO | WO 99/16201 | 4/1999 |

OTHER PUBLICATIONS

Fred Dawson, "Lighting a fire under IP telephony", CED, Oct. 1999, pp. 46–56.

Mark Komanecky, "Solving IP Provisioning Challenges", CED, Oct. 1999, pp. 82–88.

Brad Shewmake, "Microsoft teams With Nortel to offer Internet call waiting", Info World Media Group, Inc., Oct. 28, 1999, 1 page.

Lee Williams, "IP–Ready Cable Telephony", Arris Interactive brochure, Nov. 1998, 4 sheets.

H.323, Version 2.0, "A Primer on the H.323 Series Standard", DataBeam, May 15, 1998, pp. 1–16.

"S–A Wins Thinnovation Award", Channel Surfing, Broadband Magazine, p. 28.

Robert Pease, "TCI Contracts For Fiber–To–The–Curb Application", Lightwave, Nov. 1998, p. 27.

Broadband Access Systems, Inc. web site, Broadband Access Systems, Inc., 1998.

Samsung, "New Standard For Communications, Web Video Phone" brochure, Samsung Electronics, 1998.

Antec, "Cornerstone: Picture Immediate Revenues For Your Network" brochure, Arris/Nortel Company.

SmartWorks, "SmartWorks™ Call Agent", taken from 222.xybridge.com/ca–detailed2.htm, printed Oct. 4, 1999.

Colin Low, "The Internet Telephony Red Herring", Hewlett Packard, Article, 1996, pp. 1–15.

S. Harris, et al., "Intelligent Network Realization And Evolution: CCITT Capability Set 1 and Beyond," International Switching Symposium, Yokohama, Japan, Diversification And Integration Of Networks And Switching Technologies Towards the $21^{st}$ Century, Oct. 25–30, 1992, Proceedings vol. 2, pp. 127–131.

IBM Technical Disclosure Bulletin, "Workstation Communications System", vol. 37, No. 9, Sep. 1994, pp. 101–104.

C. Yang, Memo, Internet RFC/STD/FYI/BCP Archives, RFC1789, "INETPhone: Telephone Services And Servers On Internet," University Of North Texas, Apr. 1995, 5 pages.

N. Miller, "State Of The Art Dial 1–800–Internet", Byte, Feb. 1996, pp. 83, 84, 86 and 88.

R. Babbage, et al., "Internet Phone–changing the telephony paradigm?", BT Technol J, vol. 15, No. 2, Apr. 1997, pp. 145–157.

I. Naoko, et al., Abstract, "Voice Communications System And Voice Communication Method", Hitachi, Ltd., Application No. 05343162, filed Dec. 15, 1993.

M. Koji, Abstract, "Conversation/Data Alternate Communication Equipment", Oki Electric Ind. Co., Ltd., Application No. 05004142, filed Jan. 13, 1993.

W. Voigt, Abstract, "Incoming Call Indication to Data Terminal User—by Giving Engaged Data User Visual Display On Screen Wilst calling Party Receives Announcement", Telefonban & Normalzeit GMBH (TcIn).

K. Sultan, Abstract, "Call Waiting Method For Modem—Involves Displaying Signal Indicating Calls Waiting On User Screen, and Accepting Commands from User to Place Both Modems on Hold so User Can Answer Telephone Call".

\* cited by examiner

PERSONAL IP FOLLOW-ME SERVICE

A cross-reference of related applications are provided at the end of the Detailed Description of Preferred Embodiments section of the present application.

FIELD OF THE INVENTION

The present invention relates to communication between users in diverse communication systems, and more particularly, to providing a broadband communication system including an Internet Protocol Telephony Network and public switched telephone network.

BACKGROUND OF THE INVENTION

Present day telephony voice networks, have a network built around circuit switches, end offices, a toll network, tandem switches, and twisted wires. These voice networks are referred to as a public switched telephone network (PSTN) or plain old telephone service (POTS). Due to bandwidth limitations of plain old telephone service (POTS), there is an inherent inability to efficiently integrate multiple types of media such as telephony, data communication for personal computers (PC), and television (TV) broadcasts. Accordingly, a new broadband architecture is required. This new architecture gives rise to a new array of user services.

During travel or roaming, a landline IP telephony subscriber may want to forward calls directed to his home IP telephone number to another telephone number. However, the subscriber may not realize that he would like to forward his telephone number before he leaves home. Even if the subscriber knows that he would like to forward calls at his destination, he cannot easily dynamically change the forwarded number while on travel. Further, even if the subscriber knows the destination to which he wants to forward his calls, the subscriber may not know beforehand the telephone number to which calls should be forwarded. It would be useful if the IP network had the intelligence to dynamically route a forwarded call for the subscriber, without the subscriber having to select call forwarding before the subscriber leaves home.

SUMMARY OF THE INVENTION

Aspects of the invention include to providing broadband access capabilities or enhanced services for use in conjunction with a packetized network such as an Internet Protocol (IP) based system infrastructure.

Other aspects of the invention include providing one or more of the following either individually, or in any combination or subcombination:

a new broadband architecture;

broadband network capabilities, including local access;

enhanced services for use in conjunction with a packetized network such as an Internet Protocol (IP) based system infrastructure;

It is an object of the present invention to overcome the deficiencies cited above by allowing a roaming subscribers to receive forwarded incoming phone calls anywhere that the IP telephony service is available.

According to one embodiment of the present invention, a method and system for providing a dynamic call forwarding service for a subscriber in an IP telephone network is disclosed. When a predetermined telephone number is called from a telephone other than the subscriber's home telephone, the subscriber enters a code for location registration. The directory number of the telephone the subscriber is using is determined for location registration. A call for the subscriber's home telephone is then routed to the telephone the subscriber used for location registration.

Although the invention has been defined using the appended claims, these claims are exemplary and limiting to the extent that the invention is meant to include one or more elements from the apparatus and methods described herein and in the applications incorporated by reference in any combination or subcombination. Accordingly, there are any number of alternative combinations for defining the invention, which incorporate one or more elements from the specification (including the drawings, claims, and applications incorporated by reference) in any combinations or subcombinations.

DETAILED DESCRIPTION OF PREFERRED EMBODIMENTS

A new system is provided for broadband access and applications. Unless otherwise indicated by the appended claims, the present invention is not limited to the preferred embodiments described in this section but is applicable to other integrated multimedia communication systems.

I. Integrated Communication System Overview

Figure 1:
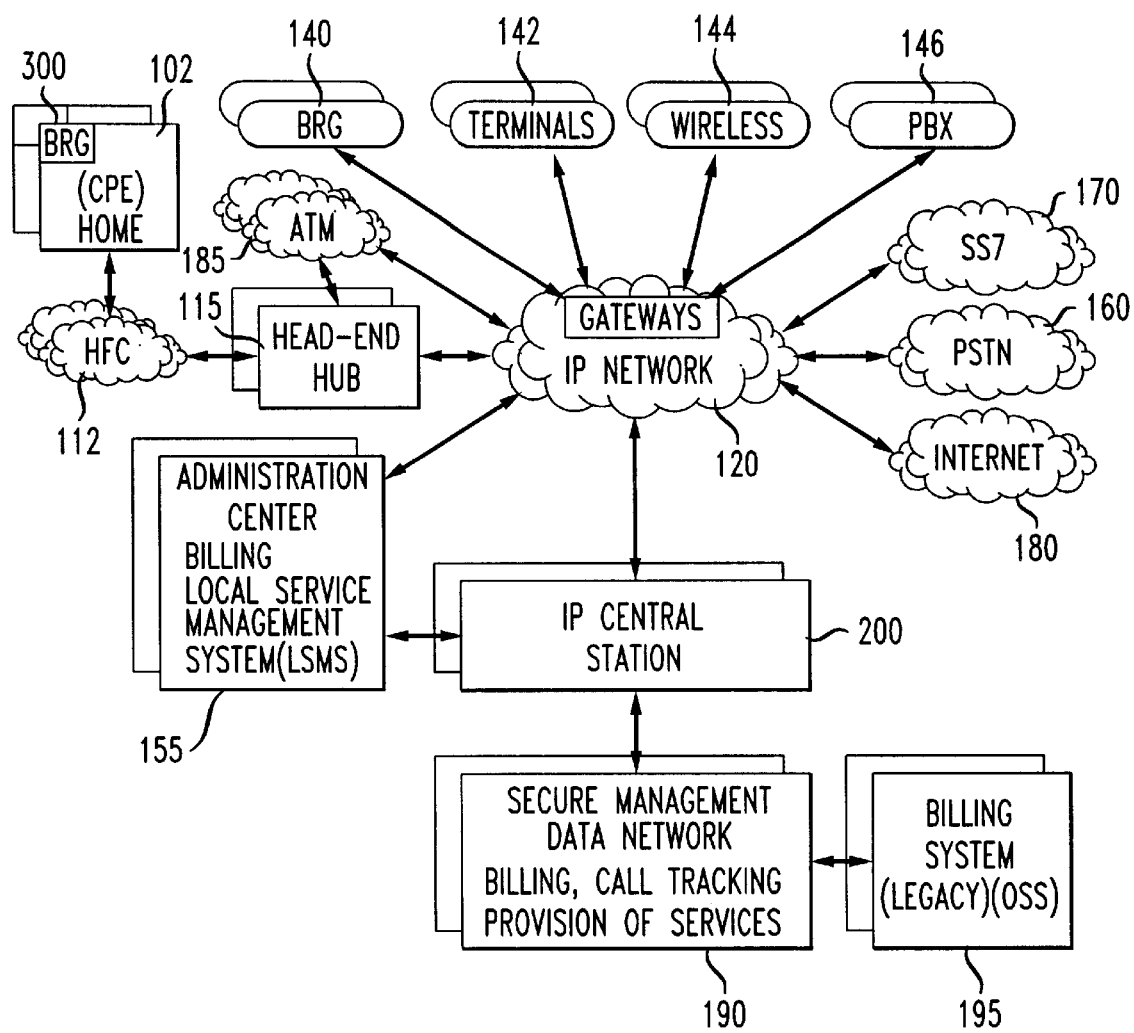
FIG. 1 shows a schematic representation of a broadband network (e.g. broadband IP based network) in accordance with a preferred embodiment of aspects of the present invention.

Referring to FIG. 1, an exemplary embodiment of a broadband network 1. The broadband network generally provides interconnection between a plurality of customer locations utilizing various interconnection architectures including Internet Protocol (IP) based network, various existing systems (legacy systems) such as the public switched telephone network (PSTN), ATM networks, the Internet, signaling networks, as well as other systems. The broadband network provides versatile intelligent conduits that may carry, for example, Internet Protocol (IP) telephony or multimedia signals between the customer premises over, for example, the public switched telephone network, Internet, or wireless communication networks.

Again referring to FIG. 1, the broadband network 1 may include one or more customer premises equipment (CPE) units 102. The customer premise equipment 102 may be variously configured. In one example, the customer premise equipment 102 may include one or more local control devices such as a broadband residential gateway (BRG) 300. Although the broadband residential gateway is preferably disposed in a residence for many aspects of the invention, in exemplary embodiments, it may also be disposed in a business or other location. The broadband residential gateway 300 may be variously configured to provide one or more integrated communication interfaces to other devices within the customer premise equipment 102 such as televisions (TV), personal computers (PC), plain old telephone system (POTS) phone(s), video phones, IP enabled phones, and other devices. For example, the broadband residential gateway 300 may provide one or more telephone port connections (e.g., plain old telephone system), Ethernet connections, coaxial connections, fiber distributed data interface (FDDI) connections, wireless local area network (LAN) connections, firewire connections, and/or other connections to a plurality of devices such as plain old telephones, IP based phones, television converters, e.g., cable television (CATV) set top devices, televisions, digital televisions, high definition televisions (HDTV), video phones, and other devices. In exemplary embodiments, the broadband residential gateway 300 may support communications between any of the aforementioned devices in intra-premises calling and/or extra-premises calling. Further, when the broadband residential gateway 300 is used in a business environment, it can function as a private branch exchange or key type telephone system.

In FIG. 1, broadband residential gateway 300 is illustrated as a single physical device. This configuration is appropriate where centralization of maintenance and control is desirable. Alternatively, the broadband residential gateway 300 may be separated into more than one physical device allowing functionality to be distributed to a plurality of different physical locations in the customer premise and/or broadband network 1. However, in many embodiments, having a centralized broadband residential gateway 300 located in a single location provides ease of maintenance, control, and re-configuration as well as a reduction in cost due to shared functionality. For example, the broadband residential gateway may be configured to provide the intelligence needed to allow each of the customer premises equipment devices to operate within the broadband network 1. For example, analog voice may be converted to digital data and packetized for transmission in an appropriate output protocol such as an Internet protocol (IP).

In exemplary embodiments, the broadband residential gateway 300 may function to couple devices within the customer premise equipment 102 to the rest of the broadband network 1 using any suitable broadband communication mechanism. In the embodiment shown in FIG. 1, the broadband residential gateway 300 utilizes a hybrid fiber-coaxial plant 112 to couple the broadband residential gateway 300 to the rest of the broadband network 1. The hybrid fiber-coaxial plant 112 may be preferred in many embodiments over other broadband communication mechanisms because of the large number of homes currently connected to cable networks, the capacity for shared access, and the ability for asymmetric data access speeds which allow high quantities of data to be distributed to the various devices in the customer premises equipment 112. The hybrid fiber-coaxial plant 112 may include coaxial cable and/or optical fiber networks in any suitable combination. The hybrid fiber-coaxial plant 112 may provide an intelligent broadband conduit between the broadband residential gateway 300 and a gateway such as the head-end hub (HEH) 115. The head-end hub 115 may be variously configured to provide various services and/or interconnections with the rest of the broadband network 1. For example, the head-end hub 115 may provide an interconnection point to gather and aggregate external services (e.g., off air and satellite video, public switched telephone network voice, multimedia messages, and Internet data) for distribution to and from the hybrid fiber-coaxial plant 112. With respect to telephony and multimedia calls, the head-end hub 115 may function as intelligent conduit for connection and communication between the hybrid fiber-coaxial plant 112 and external networks such as an IP network 120 and/or an ATM/frame relay/cell relay network 185.

The broadband network 1 may include any number of interconnected head-end hubs 115, IP networks 120, and/or ATM networks 185. Further, the IP network 120 and/or ATM network 185 may be connected to one or more other networks and devices such as:

(1) external networks including a public switched telephone network (PSTN) 170, an signaling system 7 (SS7) network 170, an Internet 180, and/or a wireless network 144;

(2) various components including one or more private branch exchanges 146, terminals 142 including computers and wireless devices, and/or one or more stand alone broadband residential gateway 300;

(3) one or more administration centers 155;

(4) one or more secure network management data networks 190 such as a network operations center (NOC);

(5) one or more billing systems 195 such as OSS; and/or (6) one or more centralized control centers such as what is referred to as an IP central station 200.

The IP network 120 and/or ATM network 185 may include one or more routers and/or other devices to route, for example, telephony calls, multimedia calls, signaling messages, administrative messages, programming messages and/or computer data between the various devices in the broadband network 1 such as the head-end hub 115, the public switched telephone network 160, the private branch exchange (PBX) 146, as well as the other devices discussed above. In preferred embodiments, the information traveling in the IP network 120 may be packetized and formatted in accordance with one of the Internet protocols. The IP network 120 may also include gateways to interface with the various other networks and/or devices. For example, the gateways may be distributed at the edge of the IP network where the IP network interfaces with one of the other devices or networks. Alternatively, the gateways interfacing the IP central station 200 to, for example, the Internet 180, public switched telephone network (PSTN) 160, signaling system 7 (SS7) 170, wireless networks 144, ATM/frame/cell relay networks 185 may be provided in the IP central station 200, or in both the IP network 120 and the IP central station 200, and/or partially distributed between the IP network 120 and the IP central station 200. Where the gateways are separated by an IP network 200, an appropriate transport protocol may be utilized to logically connect the IP central station 200 to the particular gateway.

The IP central station(s) 200 may be connected to, for example, one or more IP networks 120, ATM networks 185, secure management data networks 190, and/or administration centers 155. The IP central station 200 may be variously configured to include one or more servers and/or one or more gateways. In exemplary embodiments, the servers and gateways provide the necessary intelligence and traffic management capabilities to enable information, e.g., IP telephony signals, to travel through the broadband network 1. For example, the IP central station 200 may be configured to manage voice information transfer from the public switched telephone network 160, through the IP network 120, and into and out of one or more devices such as those connected to a broadband residential gateway 300. The IP central station may be configured to store various control and system information such as location, address, and/or configurations of one or more broadband residential gateways 300, as well as other routing and call set-up information.

In exemplary embodiments, one or more administration centers 155 may be connected to the IP network 120 and provide billing and local directory number portability administration. The local number portability may be handled by one or more Local Service Management System (LSMS) which may be included in the administration center 155 and/or in the IP central station 200. Further, the Secure Management Data Network 190 may also include a mechanism for transferring various information such as billing, call tracking, and/or customer service provisioning. Various existing systems may be utilized to provide this information such as existing billing systems (OSS) 195 and/or one or more network operations center (NOC). The network operations centers may be included in the administration center 155, the IP central station 200, and/or the billing system 195. The network operations center (NOC) may be variously configured to include a translation server to allow communications with the various disparate entities (e.g., legacy systems) in the broadband network 1.

The IP network 120 and/or the ATM network 185 illustrated in FIG. 1 may include one or a plurality of sub-networks. Each of the sub-networks may include its own IP central station 200 in a distributed configuration, with certain routing data replicated across all IP central stations or each sub-network may be connected to a single centralized IP central station 200. Where the IP network 120 includes one or more sub-networks, each sub-network may be connected to multiple head-end hubs 115. Further, each head-end hub 115 may be connected to multiple hybrid fiber-coaxial plants 112, and each hybrid fiber-coaxial plant 112 may be connected to multiple pieces of customer premises equipment 102 and/or broadband residential gateways 300. The IP network 120 provides an interconnected broadband network which may be utilized to transport and route packetized information to and from diverse geographic locations and may be used on a national or international basis. Further, the IP network 120 and/or ATM network 185 may utilize private network facilities and/or may be provisioned over a shared network such as the Internet.

The IP central station 200 may be configured to provide connectivity for the broadband residential gateway 300 to the Internet 180 (e.g., World Wide Web (www)), as well as connectivity to other external networks such as public switched telephone network 160 and signaling system 7 (SS7) 170 for end-to-end voice, multimedia, and data applications, for example voice over IP telephony. IP packets traveling through the IP network provide for priority so that, for example, voice packets are given priority over data packets to maintain certain VoIP telephony QoS requirements and a leased line concept for packet traffic which may have an even higher priority. However, the system is sufficiently flexible so that the priority can be dynamically altered according to customer preferences, variable billing rates, traffic patterns, and/or congestion.

A. Internet Protocol Central Station

Figure 2:
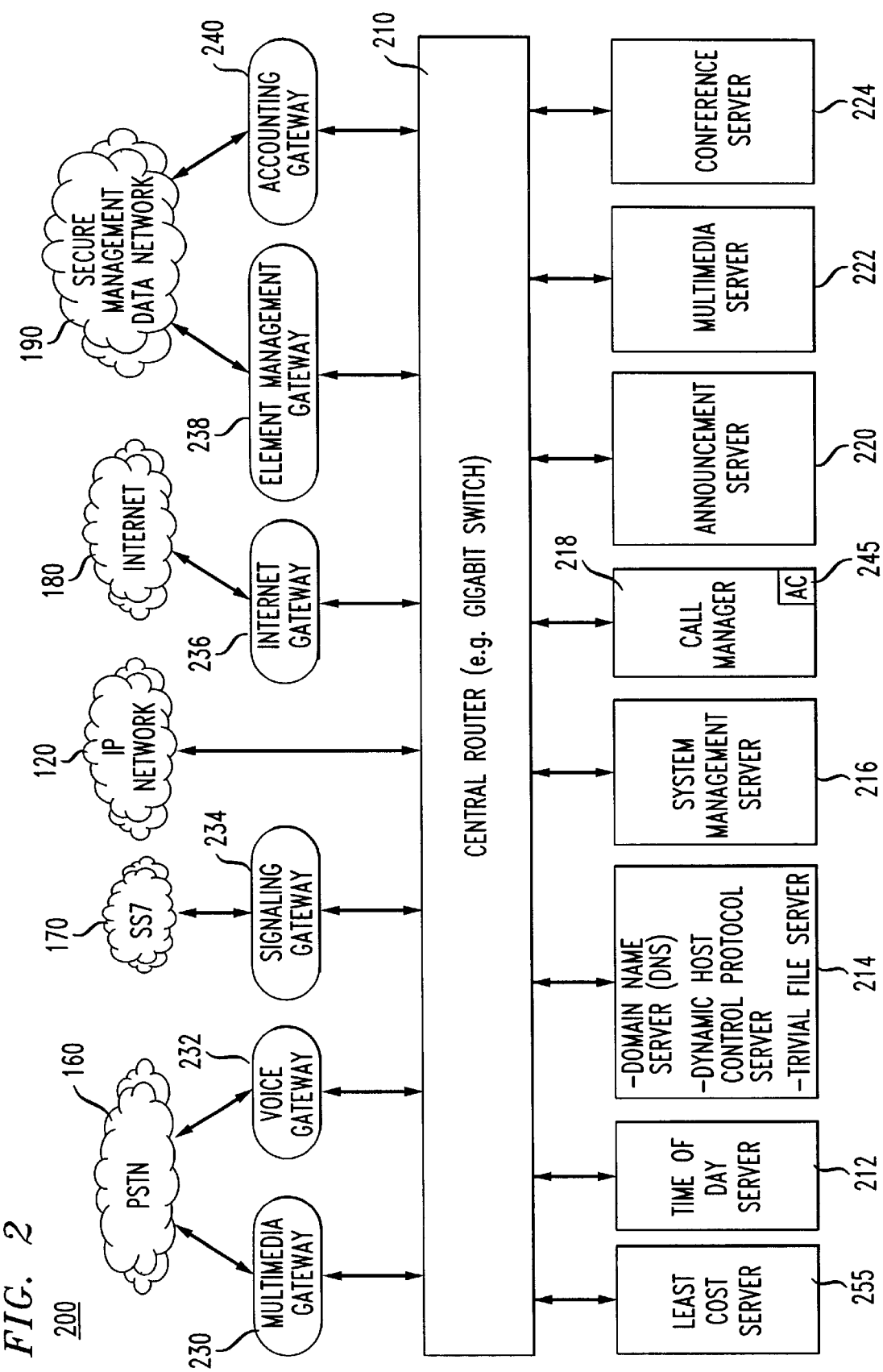
FIG. 2 shows a block diagram of a preferred embodiment of a centralized control (IP central station) in accordance with aspects of the present invention.

Referring to FIG. 2, the IP central station 200 may be variously configured. In preferred embodiments, it may be configured to ensure seamless integration of IP based communication system including the IP network 120 with the public switched telephone network 160, signaling system 7 (SS7) network 170, and the Internet 180 so that packetized data, for example, voice calls and information data, is properly transferred between the broadband residential gateway 300, the public switched telephone network 160 and/or the Internet 180. In one embodiment, the hybrid fiber-coaxial plant 112, head-end hub 115, and IP network 120, provide a virtual signaling conduit for packetized voice and data which may, with the coordination of the IP central station 200, be provided in the appropriate format between the broadband residential gateway 300 and the public switched telephone network 160 and/or Internet 180.

Again referring now to FIG. 2, the IP central station 200 may include a central router 200, for example, a gigabit switch, which may be utilized to interconnect various servers and gateways contained in the IP central station 200. The central router 210 provides for example Ethernet switching and aggregate traffic between servers, gateways and the IP network 120 and/or ATM network 185 backbone. In one exemplary embodiment, the central router 210 provides high-speed, non-blocking IP and IP multicast Layer 3 switching and routing. The IP central station 200 may include one or more of the following servers: the least cost server (LCS) 255, the time of day (TOD) server 212, the dynamic host control protocol (DHCP) server, the trivial file transfer protocol (TFTP) server, and the domain name service (DNS) server 214, the system management (SM) server 216, the call manager (CM) server 218, the announcement server (AS) 220, the multimedia server (MS) 222, and/or the conference server (CS) 224. As illustrated in FIG. 2, the servers may be separate servers, for example the call manager server 218, or may be incorporated into a single server. In the exemplary embodiment, the dynamic host control protocol server 131, trivial file transfer protocol server server 132, and the domain name service server 214 are each incorporated in a single server facility. Each server in the IP central station 200 may include computer(s), storage device(s), and specialized software for implementing particular predefined functions associated with each server. In this manner, the servers in the IP central station may be provisioned as a main server and one or more back-up servers to provide redundant processing capabilities. Similarly, the router may be implemented as a main router and a back-up router with similar routing functionality.

The IP central station 200 may also include, for example, one or more of the following gateways: a element management gateway (EMG) 238, an accounting gateway (AG) 240, an Internet (Boarder) gateway (IG) 236, a signaling system 7 (SS7)) gateway (SG) 234, a voice gateway (VG) 232, and/or a multimedia gateway (MG) 230. The IP central station 200 may utilize one or more of these gateways to provide centralized system intelligence and control of voice and/or data IP packets.

In exemplary embodiments, the dynamic host control protocol server and domain name service server 214 may operate to dynamically assign IP addresses devices in the customer premise equipment 102. Where a dynamic IP assignment scheme is used, the customer premises equipment may be provided with one or a plurality of dynamic IP assignment when activated initially, and/or at the initiation of each active secession. Where an IP address is assigned when the device is initially activated, it may be desirable to assign a single IP address to a single broadband residential gateway and assign a port address to devices connected to the broadband residential gateway 300. In other embodiments, an individual IP address may be assigned to each device coupled to the broadband residential gateway 300. For example, the broadband residential gateway may include and/or be coupled to one or more cable modems, IP phones, plain old telephone system phones, computers, wireless devices, CATV converters, video phones, and/or other devices which each may be assigned a unique static and/or dynamic IP address and/or a port of a one of these IP addresses. The particular protocol for allocating IP addresses and/or ports may be specified using protocols defined in the dynamic host control protocol server 214. In exemplary embodiments, the dynamic host control protocol and DN server 214 may be configured to assign available IP addresses from address pools based, for example, on the identity or type of requesting device, the amount of use expected for the requesting device, and/or predefined assignment protocols defined in the dynamic host control protocol and DN server 214. In centralized embodiments, it may be desirable to configure the call manager (CM) 218 to provide sufficient information such that the domain name service server 214 can distinguish between static IP devices, dynamic IP devices, registered devices, unregistered devices, and registered devices that have been assigned to a particular class of service e.g., data vs. telephony, un-provisioned, vs. provisioned, etc.

The trivial file transfer protocol (TFTP) server 214 may be configured to transfer certain information to/from one or more broadband residential gateways 300. In exemplary embodiments, the trivial file transfer protocol server provides Data Over Cable Service Interface Specifications (DOCSIS) configuration information containing QoS parameters and other information required for the broadband residential gateway 300 to operate optimally.

The time-of-day (TOD) server 212 may include a suitable facility for maintaining a real time clock such as an RFC868-compliant time server. In exemplary embodiments, the time-of-day server 212 provides system messages and/or responses to system inquiries containing a coordinated time, e.g., universal coordinated time (UCT). The universal coordinated time may be used by any of the servers and/or devices in the broadband network 1. For example, the broadband residential gateway 300 may use the universal coordinated time to calculate the local time for time-stamping error logs.

The system management (SM) server 216 may include responsibility for the overall operational state and functioning of components the broadband network 1, either alone, or in combination with other system management servers 216. The system management (SM) server 216 may be variously configured to provide monitoring and administrative functions for devices within the broadband network 1. For example, the system management server 216 may be configured to provide management of various database functions, memory buffer functions, and software utility functions within the broadband network 1. Software management includes, for example, version control, generic control, and/or module control.

The least cost server (LCS) 255 may be variously configured to enable the system to determine the least cost routing of telephone and data transmission throughout the network. The least cost server 255 may also provide one or more broadband residential gateway users capability to select between, for example, cost and Quality of Service (QoS).

The announcement service (AS) server 220 may be variously configured. In exemplary embodiments, it may store and send announcements to specified destinations and/or all destinations based on instructions received by, for example, the call manager (CM) server 218. The announcement server 220 receives, for example, Media Gateway Control Protocol (MGCP) or later signaling (e.g., H.GCP—an ITU standard Gateway Control Protocol) control messages from the call manager 218, and sends announcements to one or more voice gateways (VG) 232 and/or the one or more broadband residential gateway 300 (e.g., using Real Time Protocol (RTP) packets). The announcement server 220 may send an announcement once, a predetermined number of times, or in a continuous loop. The announcement server 220 may detect when a phone or other device has been taken off-hook and play an advertisement or other announcement to the user. Where a user has signed-up for an advertising plan whereby phone rates are reduced in return for advertising revenue generated by the advertisements, the announcement server 220 may be utilized to track the number of individuals with a particular income, age, or other profile which hear the advertisement. The announcement server 220 may respond to requests from individual system devices such as one of the broadband residential gateways 300 and/or under control of, for example, the call manager 218. Where the announcement server is under control of the call manager 218, the call manager may be configured to control various operating parameters of the announcement server. For example, the call manager 218 may request that certain announcements are sent once, a specified number of times, or in a continuous loop.

In still further embodiments, announcements may be generated elsewhere in the broadband network 1, stored as files, and distributed to one or more announcement servers via a file transfer protocol or resource such as the trivial file server 214 using one or more file transfer protocols. In many embodiments, it is desirable to store announcements in an appropriate encoding format (e.g., G.711 or G.729) within the Announcement Server. The announcement may have an audio component and/or a audio/video component. The audio/video component may be stored using a combination of an encoding format (e.g., G.711) and/or a standard file format such as wave (WAV), MPEG, and other suitable formats.

In one exemplary method of operation, a user picks up a telephone which sends a signal to the call manager 218. Subsequently, the call manager 218 may establishe a connection to the announcement server 220 and play one or more pre-recorded and/or predetermined announcement (hypertext and/or audio). Signaling tones such as a busy signal may be played by the broadband residential gateway 300 or the call manager 218, but Special Information Tones (SIT) and/or messages may also be included as part of an announcement file. In this way, the user experience is enhanced such that the user receives a busy message and/or hypertext announcement providing one of several options for contacting the called party. The announcement server 220 may have information entered by a user using, for example, a broadband residential gateway to provide additional information to the called party. The additional information may include the ability to leave a message, type-in a chat note, page the called party, barge-in on the call, and/or other user or system defined call handling capabilities.

The announcement server 220 may also be programmed with various system messages such as an announcement indicating that a number dialed is incorrect or that the call did not go through as dialed, that the lines are busy, that all lines between two countries are currently busy, that the called party has changed numbers, that the called parties phone has been disconnected, that one or more system errors have occurred, and/or other announcement messages.

The call manager (CM) 218 may be variously configured. In exemplary embodiments, the call manager 218 provides a centralized call control center for supporting call set-up and tear-down in the broadband network 1. The call manager 218 may be configured to include trunk and line information maintenance, call state maintenance for the duration of a call, and/or user service features execution. The call manager 218 may also provide for call processing functions such as a standardized call model for processing the various voice connections such as voice over IP calls. In exemplary embodiments, a standardized "open" call model may be utilized which supports standardized application programming interfaces (APIs) to provide transport services and other user functions such as calling cards. An open application programming interface and call set-up interface in the call manager will enable third party applications to be loaded into the call manager 218 and broadband residential gateway 300. This will facilitate the development of third party applications for enhancing the functionality of components in the broadband network 1. For example, third parties and other equipment vendors may manufacture various broadband residential gateways 300 for use in the broadband network 1 by writing applications to support the open call model of the call manager 218. The call manager 218 and/or broadband residential gateway 300 may also be configured to execute and/or accept commands form a standardized scripting language which may generate instructions for the call manager 218 and/or broadband residential gateway 300 to execute various functions. The scripting functionality may include the ability to execute an entire call model including interfaces to the signaling system 7 (SS7) 170, public switched telephone network 160, IP network 120, ATM/frame/cell relay network 185, and/or other functions within, for example, IP central station 200 such as the multimedia server 222, announcement server 220, system management server 216, conference server 224, time of day server 212, least cost server 255, and/or domain name server 214.

The call manager 218 may also be configured to maintain the call states for each call it handles (e.g., a voice over IP call) and respond to system events created by, for example, the multimedia gateway control protocol (MGCP) messages and/or integrated services digital network user part (ISUP) messages for signaling system 7 (SS7) protocol that may occur during the processing of a call. Exemplary events handled by the call manager 218 include call state changes, call feature changes/call feature triggering events, changes in the status of lines and trunks, and/or error conditions. Further, the call manager 218 may interact with devices connected to a single circuit on the public switched telephone network 160 and/or a device connected to a port of the broadband residential gateway 300. In this manner, new devices may be added to the infrastructure and operate using the open call model contained in the call manager 218.

The call manager 218 may also include storage for subscriber and network configuration, a cache server for faster access to frequently used data, a routing engine for selecting an appropriate routing algorithm (e.g., least cost routing), and/or a service broker which provides the data and logic for specific services. In addition, the call manager 218 may include an authentication (AC) server 245 that provides authentication of various devices, objects, packets and users in the integrated multimedia system. In this manner, a user may verify the identity of the calling or called party. The call manager 218 may interact with the signaling gateway (SG) 234, the accounting gateway (AG) 240, the element management gateway (EMG) 238, the voice gateway (VG) 232, and the multimedia gateway (MG) 230 using any suitable protocol such as IP and an interconnection mechanism such as the central router 210. In one preferred embodiment, the call manager 218 may be configured to utilize signaling messages such as: a) ISUP messages over Common Object Broker Architecture (COBRA) interface to and/or from signaling gateway 234, b) MGCP, SIP—simple internet protocol, H.GCP, and/or other suitable control messages to and/or from the announcement server 220, c) call event records in modified Radius format to the accounting gateway 240, d) Radius (or Enhanced Radius or compatible protocol) control messages to and/or from the voice gateway 232 and/or the broadband residential gateways 300, and e) signaling network management protocol (SNMP) messages to and/or from the element management gateway 238.

The call manager 218 may incorporate one or more databases. For example, the call manager 218 may include database information such as (1) a resources database that provides an identification of what resources are connected to the broadband network 1 and their current state; (2) a trunk/gateway database that indicates which gateway serves what circuits in a trunk; (3) a customer database which indicates whether a call is authorized, identifies what services a line supports and determines whether a telephone number is on or off the integrated IP communication network; (4) a numbering plan/least cost routing database which provides routing information that enables the IP central station 200 to choose the correct trunk as a function of the call number; and (5) a local number portability (LNP) database that indicates the North American Numbering Plan (NANP) and associated prefixes which are open for association with the number portability service; and (6) an address of the service control point (SCP) towards which requests for translating these local portability numbers should be routed.

In exemplary embodiments, the broadband network 1 includes equipment compatible with the COBRA standard. COBRA may be utilized to allow applications from a plurality of vendors to operate with each other. The COBRA standard allows a company, such as AT&T, to build its network using multi-vendor equipment and yet ensure seamless integration and operation. Some of the major areas covered by COBRA v. 2.2 includes: Inter-ORB Bridge Support, General Inter-ORB Protocol (GIOP) support, Internet Inter-ORB Protocol (IIOP) support, and Environment Specific Inter-ORB Protocol (ESIOP) support. The call manager 218 may integrate these protocols to facilitate call set-up with diverse equipment. This is advantageous in that equipment from a plurality of vendors may interoperate over the broadband network 1 without modification.

The multimedia server (MS) 222 may be variously configured. For example, one or more multimedia servers may provide support for multimedia messaging service and/or the overall management of multimedia voice and mail messages transmitted across the broadband network 1. The multimedia server may be configured to support e-mail (e.g., html) messages, voice mail (audio) messages, and/or video mail (audio and video) messages. The multimedia messages may include standard pre-configured system messages, advertising messages, and/or user defined messages. In either event, where the messages are stored in a centralized location, the multimedia server may provide such storage. Where the multimedia server 222 provides storage for the multimedia messages, a database may be utilized for indexing, storage, and retrieval of such messages. In exemplary systems, the user may access predetermined ones of these messages. The multimedia server 222 may utilize IP as a method of communicating with other devices across the broadband network 1.

The conference server (CS) 224 may be configured to provide for multiparty conference calls using, for example, IP voice packets during an IP telephony or multimedia session call. The conference server 224 may include specialized software that runs on a computing platform having associated multiplexing and demultiplexing capability for segregating and aggregating user information packets. For example, the conference server may log several calls into a conference session. When information packets are sent from one or more phones, they are aggregated and sent to the other phones on the conference call. The conference server 224 may use any suitable communication protocol such as H.GCP or SIP. The conference server 224 may function to aggregate user information from two or more users onto a single call path. The conference server 224 may include one or more "call-in numbers" and be controlled from any location, e.g., a centralized operator location and/or one or more broadband residential gateways 300. It may be desirable to have the conference server 224 configured such that some callers simply monitor the call without voice interruption while other callers have both voice transmit and receive capabilities. Where a caller is not given the privileges associated with active participation in the call, voice packets from these users are discarded. For example, a CEO may have a conference call with a plurality of financial advisors and invite the press to listen on the call without interruption capabilities.

The gateways in the IP central station 200 may be configured to provide translation of signals to and/or from the various servers in the IP central station 200, the IP network 120, the public switched telephone network 160, the signaling system 7 (SS7) network 170, the Internet 180, and/or the secured management data (SMD) network 190. The gateways typically support one or more of the following group of functions: call processing; signaling system 7 (SS7) connectivity; billing support; OAM&P support; connection to public switched telephone network; control CoS/QoS parameters; and enhanced services.

The voice gateway (VG) 232 may be connected to the public switched telephone network 160 and operate to convert between IP based voice packets and standard public switched telephone network 160 voice traffic. Voice gateway 232 may be configured as multi-frequency (MF) or ISUP gateways on a per-T1 basis. Where multi-frequency (MF) trunks are used, one embodiment utilizes signaling between the call manager 218 and the voice gateway 232 using MGCP, SIP, H.GCP and/or other compatible protocol. Multi-frequency trunks may be compatible with Feature Group D (FGD), Operator Service (OS) Signaling protocol and/or Termination Protocol (TP).

The IP central station 200 may be variously connected to the public switched telephone network network. For example, the IP central station 200 may be connected directly to the public switched telephone network using, for example a bearer channel (e.g., a T1 or T3 carrier) and/or interconnected using one or more networks such as an IP network and/or ATM/frame/cell relay network 185. Where a T1 network is utilized, it may be desirable to utilize one or more of ISUP or MF, FGD, and OS to interconnect a service bureau in the public switched telephone network 160. Alternatively, the service bureau in the public switched telephone network 160 may be interconnected using an alternative network arrangement such as an IP network 120 and/or a ATM/frame/cell relay network 185. The service bureau may coordinate with the IP central station 200 in providing operator services, directory services and provisioning for 311, 611, and 711 services. Emergency 911 services may be routed to an E911 tandem switch that has the appropriate databases and interfaces with a Public Safety Answering Position (PSAP). Emergency 911 services may be coordinated by the call manager 218 and/or public switched telephone network based service bureau.

Voice gateway 232 may be router-based and include one or more voice feature cards and/or DSP Module cards to perform voice processing. The voice gateway 232 may optionally include host processors, LAN/WAN ports, Ethernet ports, T1 or E1 telephony interface cards, Voice Feature Cards with DSP Modules providing voice compression transcoding (G.711 and G.729), carrier-quality echo cancellation with 8 ms–32 ms tail length, a de-jitter buffer which adapts to delay variations in the network in order to minimize the delay, packet loss concealment that generates concealment frames for lost packets using information from previously received data, and/or tone detection and generation. This function detects Multi-Frequency (MF) tones and generates MF and call processing tones (e.g. dial tone, call-waiting tone etc.).

In exemplary embodiments, the voice gateway 232 may include T1/E1 interfaces with internal Channel Service Units (CSUs). It may also be desirable to configure the voice gateway 232 such that ISUP, MF and Centralized Attendant Services (CAS) trunks are supported with a configuration done on a per T1 basis. Additionally, multi-frequency tones and Centralized Attendant Services may utilize a "robbed bits" communication scheme where bits are "robbed" from sub-frames to transmit in-band signaling. The multi-frequency tones may be converted to and/or from, for example, simple gateway control protocol (SGCP) signal requests and events by the voice gateway 232. For example, multi-frequency tones and/or lower level signaling and timing functions may be translated to and/or from any of the following indications: simple gateway control protocol Notify functions, simple gateway control protocol Notification Requests, Connection requests, Modify Connection requests, off-hook and/or on-hook indications.

An Ethernet interface with a RJ-45 connector may be used to connect the voice gateway 232 to the central router 210 (e.g., Gigabit Switch or High Speed Router (HSR)). The multimedia gateway control protocol may be used as the interface between the voice gateway 232 and the call manager 218. For example, call control, signaling, and multimedia data stream, real time protocol (RTP) connections, IP addresses, UDP ports, codec choice etc, may be configured in any suitable manner such as by using a multimedia gateway control protocol. In exemplary embodiments, audio streams may be passed directly between customer premises equipment 102 using real time protocol connections over, for example, a user datagram protocol (UDP). Thus, the multimedia gateway control protocol may be utilized to request the voice gateway 232 to initiate, cancel, and/or otherwise modify connections in order to set up and tear down RTP media streams. A similar procedure may also be utilized to request continuity tests and results.

In exemplary embodiments, it may be desirable to adapt the IP network to carry signaling system 7 (SS7) Transaction Capabilities Application Part (TCAP) messages over the IP network 120 and/or the ATM/frame/cell relay network 185. The transport of signaling system 7 (SS7) transaction capabilities application part (TCAP) messages over the packet networks allows signaling operations to be supported by multiple connections to the same host, multiple host connections, and distributed processing of call set-up information using, for example, multiple call managers 218 in the broadband network 1. Thus, the IP network 120 and/or ATM/frame/cell relay network may be utilized to interconnect a plurality of ESS switches to transport signaling information, voice, and/or data. In embodiments where the signaling gateway (SG) 234 is configured to support signaling system 7 (SS7) signaling transport using transaction capabilities application part (TCAP) messages, it may be desirable to include a translator for converting between multimedia gateway control protocol (MGCP) messages and transaction capabilities application part (TCAP) messages and/or ISDN User Part (ISUP) messages.

The point where ISUP and TCAP messages are terminated at a signaling system 7 (SS7) signaling gateway is defined as a Service Switching Point (SSP) to the signaling system 7 (SS7) network 170. The call manager 218 may be configured with a standardized Application Programming Interface (API) to allow interaction with the signaling system 7 (SS7) by, for example, sending and/or receiving ISUP and TCAP messages from a service switching point (SSP). Full class 5 signaling system 7 (SS7) functionality may be included in the call manager 218 including the ability to provide all of the information necessary for billing as defined in the GR-246-Bellcore standard. The signaling gateway 234 may be arranged to perform: signaling system 7 (SS7) message handling (message discrimination, message distribution, and message routing); signaling link management (e.g., link activation, deactivation); signaling route management (managing Point Code [PC] route status based on route received management messages such as Transfer Prohibited, Transfer Allowed, Transfer Restricted, etc.); and signaling traffic management (diversion of traffic based on unavailability, availability, restriction of signaling link, route, and Point Code.) The signaling system 7 (SS7) architecture supports the necessary redundancy component scheme for system reliability and availability during scheduled maintenance and/or software/hardware upgrades. The signaling gateway 234 may be configured to directly provide for lower level signaling system 7 (SS7) processing.

In exemplary embodiments, the signaling gateway 234 interacts with the call manager 218 using an appropriate open interface (e.g., Common Object Request Broker Architecture (COBRA)). In these embodiments, it may be desirable for translation software in the signaling gateway 234 to add Message Transfer Part (MTP) layer information to the ISUP and/or TCAP data to create a complete signaling system 7 (SS7) message. The complete signaling system 7 message may then be sent to the Signaling Transfer Point (STP) in the external signaling system 7 (SS7) network 170. Conversely, the signaling gateway 234 may be configured to remove ISUP or TCAP application layer data from the signaling system 7 (SS7) messages received from the STP prior to converting the information to an appropriate open interface (e.g., COBRA) and forwarding the information to the call manager 218 via the central router 210.

The accounting gateway (AG) 240 may be configured to receive messages representing events from the call manager 218 via a suitable transport mechanism such as the central router 210. Typically, two messages are received for each call, the first when the call is established, and second when the call terminates. In the case of unsuccessful calls, only the failure message will be logged. The messages provide details about the calling and called parties, the timing of the call set-up, the duration and the quality of the call. Accounting gateway 240 may be duplicated using a redundant computer, with each gateway having dual-mirrored disks. The accounting gateway 240 stores usage records and may then distribute them to linked destinations (e.g., billing centers) for processing. Billing centers typically include bill processors that receive accounting information from the accounting gateway 240 and generate appropriate on-line or paper billing to customers. The accounting gateway may be configured to accommodate multiple days worth of accounting records such as the records for one day, two days, three days, four days, a week, or a month. The period in which the data is retained in the accounting gateway may be dependent on business needs, hardware restrictions, and/or the billing cycle. For example, as the end of the billing cycle nears, it may be desirable to shorten the period the accounting gateway holds the data such that calls placed the day the bills are printed are included on the bills. Further, the accounting gateway may both retain and forward data to the billing centers. In this manner, if the equipment at the billing center fails, the accounting gateway 240 may serve as a backup. Similarly, the billing center may act as a backup where the accounting gateway 240 fails.

An Automatic Message Accounting (AMA) format is typically used by circuit-switching systems, packet-switching systems, and other network elements to provide billing usage measurements data (e.g., the Bellcore® Automatic Message Accounting Format (BAF)). This data may be utilized either to permit charging the customer for use of network resources or to permit charging other carriers (e.g., InterExchange Carrier (IEC) and other Local Exchange Carrier (LEC)) for assistance in placing call connections. The accounting gateway 240 may be configured to convert this information into an Automatic Message Accounting Format (AMA) Format (e.g., BAF) records and send these records to the external billing systems using, for example, a TFTP (trivial file transfer protocol). Time-stamp accuracy is typically based on the accuracy of the call manager 218 clock which may be derived from the TOD 212 server. To create appropriate AMA records, the event information produced by the call manager 218 preferably has appropriate information for the telephone service specified such as phone number of the calling party (customer), phone number of the called party (customer), time of call, duration of the phone call, and use of any discretionary features. Different AMA structures may be generated between On-Net calls (defined as within a network service provider IP network 120) vs. Off-Net calls (defined as outside of service provider IP network—e.g. public switched telephone network) for billing purposes.

The element management gateway (EMG) 238 may provide system management functionality that includes, for example: a) status and performance monitoring for the Operation Administration, Maintenance, and Provisioning center, to gauge the ongoing operation of applications; b) extensive information exchange with a network operations center responsible for ongoing maintenance of one or more applications; c) customizable operations interface to allow the network operations center to view only information required, thus reducing the time spent filtering information; d) centralize distributed application configuration allowing for the centralized configuration of objects residing on a plurality machines; e) proactive network management capabilities to remove the need for constant operator intervention making the day-to-day operations more efficient; and/or f) intelligent display of status information to separate critical issues from low-priority problems allowing the operation center to assign resources to the right problems at the right time.

The multimedia gateway (MG) 230 may be configured to connect to the public switched telephone network 160 and to convert IP based multimedia packets into standard public switched telephone network 160 traffic. The multimedia gateway 230 may include an intelligent trunking interface that communicates with the call manager 218 for automatic trunk sizing and allocation between the IP network 120 and the public switched telephone network 160. For example, when an system user at the customer premises is using a PC and/or a multimedia phone to communicate with a traditional public switched telephone network 160 user, the communication session involves the transmission of video and audio data. The bandwidth that is required for this type of communication is much greater than that required for a PSTN-to-PSTN voice call or an IP-to-PSTN voice call. The multimedia gateway 230, as the interface between two systems, may negotiate a larger bandwidth to facilitate the call if the called party is also video enabled. This bandwidth negotiation process typically occurs with a 5ESS or a Local Digital Switch within the public switched telephone network 160. Typically, a multimedia call, including live video, audio and data, will require bandwidth ranging from 56 K to 1.544 Mbps. However, as the number of users sharing the same link grows, the quality of the transmission deteriorates significantly. The multimedia gateway 230 must be able to monitor bandwidth usage and make appropriate adjustments so as to maintain an acceptable quality of service. Further, it may be desirable for the call manager 218 and the multimedia gateway 230 to communicate between themselves and/or the customer premises equipment 102 to determine whether the user has authorized the additional bandwidth and hence expense of the call. For example, even where a called and/or calling party is video enabled, it may nonetheless refuse to authorize payment for the increased bandwidth necessary for video.

The Internet gateway (IG) 236 may be connected to the Internet (e.g., World Wide Web (www)) and provide a means for IP based data packets to be routed between the IP network 120 and the Internet 180. Alternatively, IP based voice packets may be routed via the Internet 180. In exemplary embodiments, the Internet gateway 236 routes data-only packets which share the same priority level with other lower priority, non-real-time traffic consistent with computer data communications presently experienced with the Internet 180. Consequently, low priority and low latency data traffic on the IP network 120 utilize the Internet gateway 236 to communicate with other IP data networks such as the www. Voice packets may be routed through another network such as the ATM/frame/cell relay network 185, a private IP network 120, and/or the public switched telephone network 160 where committed information rates may be easily obtained.

In exemplary embodiments, the broadband network 1 includes the interfaces which enable connections to existing Operation, Maintenance and Provisioning (OAM&P) 195 systems that support, billing, accounting, provisioning and/or configuration management functions. A Secured Management Data (SMD) Network 190 may be utilized to connect the OAM&P 195 to the accounting gateway 240 and element management gateway 238. The Secure Management Data network 190 may include a Network Service Division's NSD Net. The Secure Management Data network 190 helps ensure that only secure communication can occur between the IP central station 200 and the OAM&P 195. This eliminates one potential means of tampering with the billing and provisioning functions in the OAM&P. The billing systems (OSS) 195 may include the Network Operations Center (NOC). The NOC may include a translation server which includes functions for allowing communications and control of diverse networks.

B. Broadband Residential Gateway (BRG)

Figure 3:
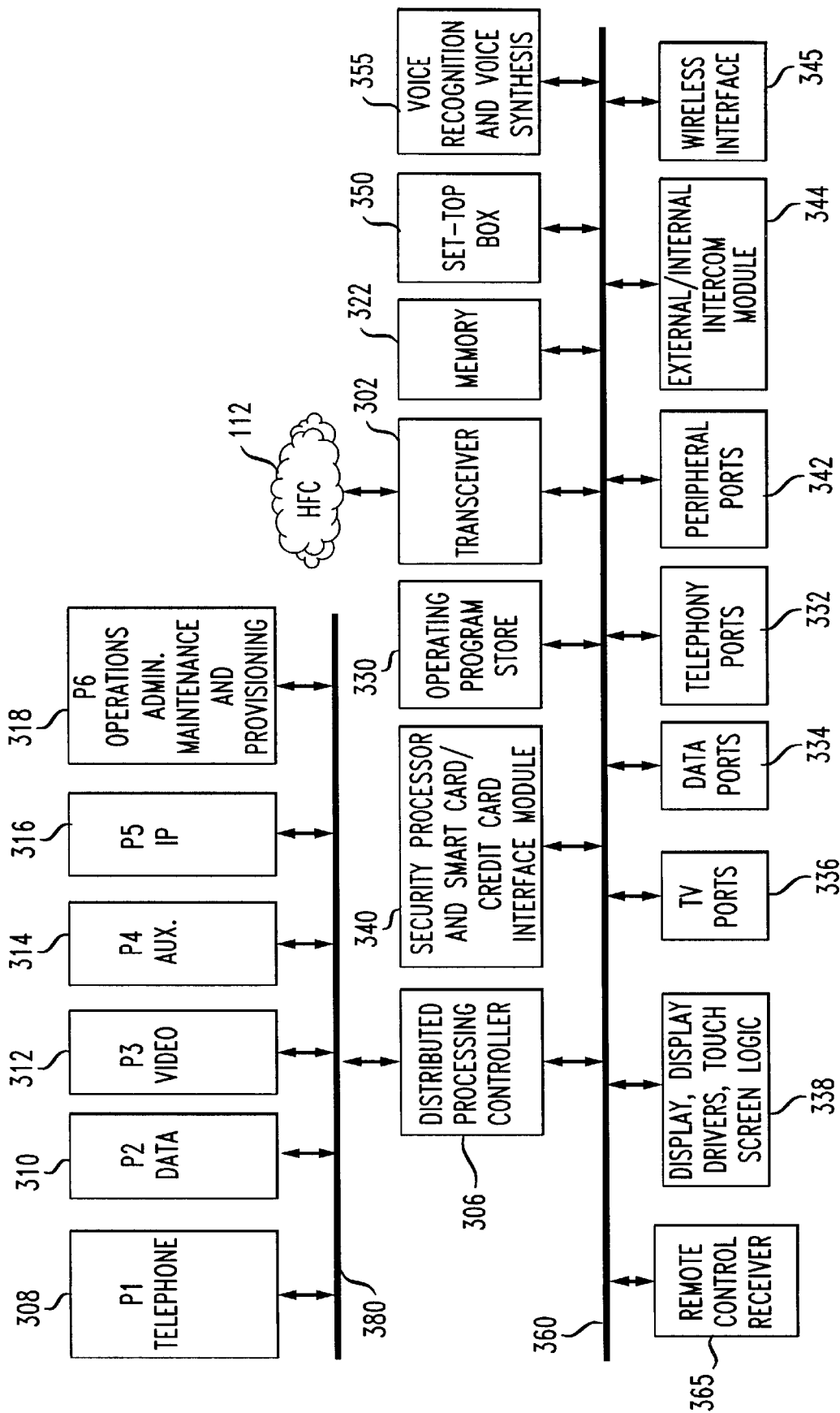
FIG. 3 shows a block diagram of a preferred embodiment of a local control apparatus (broadband residential gateway) in accordance with aspects of the present invention.

Referring to FIG. 3, a preferred embodiment for a broadband residential gateway (BRG) 300 will now be described and explained. The broadband residential gateway 300 may be configured as the interface unit between the remainder of the customer premise equipment 102 devices and the external network. The broadband residential gateway 300 may be connected to the remainder of the broadband network 1 using any suitable mechanism such as a gateway directly into an IP network and/or a cable connection. In the most preferred embodiments, a hybrid fiber-coaxial plant connection is utilized such as hybrid fiber-coaxial (HFC) plant 112. The hybrid fiber-coaxial plant 112 allows numerous broadband residential gateways 300 to be included on an existing hybrid fiber-coaxial plant 112 without modification to the plants infrastructure.

The broadband residential gateway 300 may be variously configured to, for example, provide high-speed cable modem capabilities to interconnect one or more associated PCs with each other and with the remainder of the broadband network 1, provide functionality to one or more TVs (using, for example, either an integrated or separate decoder functionality, e.g., set top box 350), one or more telephone connections such as plain old telephone service (POTS) phones and/or digital telephones, displays, wireless interfaces, voice processing, remote control interface, display interface, and/or administrative functions. In exemplary embodiments, the broadband residential gateway 300 may a) providing conversion between analog voice and IP voice packets, b) multiplexing/demultiplexing streams of IP voice packets, c) supporting multiplexing/demultiplexing of multiple incoming and outgoing signals including multiple voice, multimedia, data, system administration, and/or TV information signals.

Where the elements of the broadband residential gateway 300 are interconnected, the interconnection may be provided by one or more data buses, for example, a high speed bus (HSB) 360, processor bus 380, and/or other interconnection system. The high speed bus 360, 380 may be configured to provide a flexible conduit for transferring information between the internal hardware, processors and ports. In exemplary embodiments of the broadband residential gateway 300, the high speed bus 360 may include one or more of the following functional units a) a universal remote control receiver module 365 for receiving wireless (e.g., infrared, and/or RF) signals (e.g., keyboard signals and/or remote control signals) for control of the broadband residential gateway 300 and/or any connected devices, b) a display, display driver, touch screen logic module for driving one or more local and/or remote displays for interfacing with the broadband residential gateway 300 and/or one or more connected devices, c) one or more TV port modules 336 for interconnecting televisions, set-top devices, and/or other audiovisual devices to the broadband residential gateway 300, d) one or more data port modules 334 for connecting/interconnecting data enabled devices (e.g., personal computers, palm top devices, ect.), e) one or more telephony port modules 332 for interconnecting one or more analog and/or digital telephones, f) one or more peripheral port modules 342 for interconnecting one or more peripheral devices such as disk drives, data storage devices, video cassette recorders, DVD devices, audio devices, video devices (e.g., camcorders, digital cameras, digital video recorders, stereos, etc.), g) one or more external/internal intercom modules 344 for interconnecting remote intercom and/or security monitoring devices, h) one or more wireless interface modules 345 for interconnecting with various wireless extension devices such as wireless TVs, cordless and/or wireless telephones, wireless LANs, etc., i) one or more voice recognition/voice synthesis modules 355 for generating voice announcements, voice messages, and voice prompts and for recognizing voice generated commands and data, j) set-top box module 350 for performing the functions associated with a set-top box locally and/or for communicating with one or more remotely coupled set-top boxes, k) memory 322 (e.g., DRAM, RAM, flash, and/or other memory) for storing information and operating data within the broadband residential gateway 300, l) transceiver 302 for communicating with one or more external broadband networks m) operating program store 330 (e.g., ROM, flash, etc.) for storing at least portions of the operating programs for the broadband residential gateway 300 and/or interconnected devices, n) security processor, smart card and/or credit card interface module 340 for providing secure processing functions and/or credit card/smart card transaction functions, and/or o) distributed processing controller 306 which may be a microprocessor and/or one or more interconnected distributed processing modules for controlling the broadband residential gateway 300. Where the distributed processing controller 306 includes one or more distributed processing modules, the modules may include a telephony processing module (P1) 308, data processing module (P23) 310, video processing module (P3) 312, auxiliary processing module (P4) 314, IP processing module (P5) 316, and/or an operations administration maintenance and provisioning processing module (P6) 318 interconnected through one or more busses such as processor bus 380. The processor bus 380 and/or high speed bus 360 may include any suitable interconnect bus including intelligent bus configurations incorporating smart buffer logic (not shown in FIG. 3) to facilitate data transfer between interconnected processors and/or modules. The various modules and/or processing components of the broadband residential gateway 300 may be powered by, for example, a power supply unit (not shown). Each of the individual modules of the broadband residential gateway will now be described in more detail.

The transceiver 302 may include circuits for converting digital signals to and from RF signals suitable for transmission across a broadband network such as the hybrid fiber-coaxial plant 112. The transceiver 302 may include one or more input/output ports such as a cable interface (e.g., an F connector cable connection) and/or a fiber optic interface connected to a communication media (e.g., hybrid fiber-coaxial Plant 112). The transceiver 302 may be compatible with the DOCSIS 1.0 or later specifications. For signaling purposes, the broadband residential gateway 300 may be compatible with the Media Gateway Control Protocol (MGCP) or other compatible signaling protocol (e.g., SIP or H.GCP) to support telephony applications. The transceiver 302 may serve as a modem, a translator and/or a multiplexor/demultiplexor. Data received from the network may be de-multiplexed and placed on the data bus for dispatch to the appropriate peripherals and/or ports. Data from the various ports and peripherals may be multiplexed together for distribution over one or more broadband networks (e.g., the hybrid fiber-coaxial (HFC) plant 112). Where a hybrid fiber-coaxial plant 112 is utilized, the data may be multiplexed onto various frequency bands of the hybrid fiber-coaxial plant 112 in a continuous data stream(s) and/or packetized data stream(s). To facilitate data transfer for various networks, the transceiver 302 may be include one or more registers for data queuing and/or IP tunneling of data packets across the broadband network.

Although the illustration of a display, display drivers, and touch screen logic device 338 suggests that the a display is integral to the broadband residential gateway 300, alternative embodiments of the broadband residential gateway 300 may provide a user interface via the TV screen, PC screen, video telephone, and/or other display device in addition to, or in lieu of, a display integral to the broadband residential gateway 300.

The peripheral ports module 342 may include a plurality of ports providing connectivity to external peripherals. Exemplary interfaces include, PCI, Firewire, USB, DB25, etc. Devices which incorporate one or more of these interfaces may utilize the broadband residential gateway 300 to interconnect to the remainder of the boadband network 1.

The external/internal Intercom Module (IM) 344 may include one or more microphones/speakers, voice CODECs, telephony processors, and/or interface ports. Where an intercom module 344 is utilized, the built-in circuitry may be configured to detect, for example, unused plain old telephone system telephone(s) and generates a special intercom tone on these unused telephones. In this manner, existing plain old telephone system telephones, digital phones, and/or other devices may serve as an intercom throughout the residence. The controller 306 (e.g., such as the P1 telephony processor 308) may function to command the intercom module 344 to determine an appropriate intercom path to select an intercom connection between various locations. In exemplary embodiments, the CODEC may be configured to convert the analog voice signal into IP packets for transmission over one or more data ports 334, TV ports 336, display modules 338, telephony ports 332, peripheral ports 342, external/internal intercom ports 344, wireless interface ports 345, and/or set-top boxes 350.

In yet further embodiments, multiple broadband residential gateways 300 may be configured through, for example, IP tunneling, to set-up an intercom connection between multiple remote broadband residential gateways 300. In this manner, an administrative assistant at the office may be contacted via an intercom connection present at the users home. Thus, one or more individuals disposed at either local and/or remote locations with diverse types of equipment may communicate as an intercom group without the need to communicate via normal dialing procedures.

In addition to intercom services, the intercom module 344 may also configure intercom services for other telephony services (e.g., extension transfer, call conferencing, internal caller ID), high speed data services (e.g., LAN connections), facsimile transmission/reception, e-mail transmission/reception, video conferencing, and/or CATV/HDTV (Cable Television/High Definition Television) using standard industry protocols such as DOCSIS 1.0 or higher and IP tunneling transmissions. These services are advantageous in that once configured, the user may simulate a work environment in his home.

Though processing may be accomplished by a single processor performing all functions (e.g., processing controller 306), in the preferred embodiment shown in FIG. 3, the architecture employs a distributed processing controller 306, and a plurality of processors P1–P6 308–318. In the distributed processing architecture, each of the plurality of processors P1–P6 may be configured to have a dedicated function to provide predetermined services or applications. The processors may be coupled together via any suitable mechanism such as the processor bus 380 and/or high speed bus (HSB) 360. The first processor P1 308 may include telephony applications such as call set-up, call tear down, and call functions; the second processor P2 310 may include management functions such as distribution and coordination of data within the various devices of the broadband residential gateway 300; the third processor P3 312 may include video processing functions for configuring control panels, screen displays of attached devices, video conference calls, MPEG decoding functions and other video processing functions; the fourth processor P4 314 may include an auxiliary processor for off loading special processing functions such as numeric processing; the fifth processor P5 316 may include interface input/output processing (e.g., text to voice and vise versa) and/or Internet protocol (IP) processing functions for configuring data to communicate with the remainder of the broadband network 1 and/or devices attached to the broadband residential gateway 300 such as IP telephones or IP enable PCs; and the sixth processor P6 318 may include processing functions for Operation, Maintenance and Provisioning (OAM&P) processing. Each of the above processors may be an entirely separate processing unit with included RAM, ROM, Flash memory, or may share RAM, ROM, and/or Flash memory. Where shared RAM, ROM, and/or Flash memory is utilized, the memory may be located within the distributed processor controller 306 and/or on the processor bus 380. Alternatively, the memory may be integrated into the operating program store 330 and/or into memory 322.

The Distributed Processing Controller 306 with its associated processors (P1–P6) may be coupled to the various elements of the broadband residential gateway 300 so as to enable proper operation of each of the individual components. For example, the distributed processing controller 306 (with any associated processors (P1–P6)) may also coupled to the security processor, smart card/credit card, and interface module 340, the peripheral port(s) module 342, and/or the External/Internal Intercom Module 344 for providing control and coordination among devices coupled to the high speed bus 360.

The display 338 may include, for example, an interactive LED/LCD module positioned in a suitable location such as within or attached to the broadband residential gateway 300. The display 338 may include an interface to notify, display and receive user inputs and processing status. The display 338 may be configured to display various informational status such as multimedia mail, called ID, call logs, call in progress and associated information, call waiting information, call conferencing, and/or other call related information. The display 338 may provide a display of real time status of the various devices connected to the broadband residential gateway 300 as well as any current connections, calls, and/or data transfers. The display 338 may also include touch screen capabilities that allow information to be input via a plurality of interrelated on-screen prompts, on-screen icons, and/or a keypad (e.g., an alphanumeric keyboard). The keypad may be a remote control, numeric keyboard, and/or alphanumeric keyboard.

In one embodiment of the display 338 operation, a user may touch an icon representing a pending voicemail and/or multimedia mail message. The panel may be configured to send an electronic signal to the processing controller 306 and/or an attached processor such as the telephony processor. On receiving the signal, the P1 telephony processor 308 may be configured to generate an IP packet via the transceiver 302 across portions of the broadband network 1 to the multimedia server 222 in IP central station 200. The multimedia server 222 may authenticate the request by, for example, verifying location of the request and/or the identity of the requesting party. Where identity of the calling party is being verified, the user enter an access password by an audio and/or keyboard request. Where an audio request is generated, the user may utilize the external/internal intercom module 344 of the broadband residential gateway 300, or via a text message entered into the display 338. The user may then enter the appropriate access code via the onscreen soft keypad, microphone, and/or keyboard. Alternatively, the message could be stored locally in the broadband residential gateways 300 memory 322 and depending on whether there is a password lock on the broadband residential gateway 300, the user may not have to enter a password to access the message. Where the message is stored locally in the broadband residential gateways 300 memory 322 rather than IP central station, the display 338 simply recalls the message from memory and presents to the user to provide one-touch instant message retrieval.

In embodiments where the broadband residential gateway 300 supports multiple mailboxes, the icons on the LCD/LED may be personalized to show the identity of the owner of the message. Each user may have a different password to ensure privacy of access. An activity log which tracks past and present messages and/or archives multimedia messages may be presented on display 338. The archive may be stored locally, or at a remote location such as IP central. The archive may be utilized by the user to recall messages which have long since been erased from local storage but may be retrieved from IP central on tape and/or disk storage. This is preferably an optional feature for those users who are less security conscious. The multimedia messages need not be displayed only on display 338. In alternate embodiments, any of the peripheral devices attached to the broadband residential gateway 300 are capable of receiving the multimedia messages.

The memory 322 may be variously configured to include one or more field-upgradeable card slots for permitting memory expansion. Certain users may wish to enable higher end applications such as near video on demand (e.g., pausing of shows via buffering in memory), video conferencing of multiple users, multi-party conferences, call waiting for multiple parties, etc. Accordingly, the use of a broadband residential gateway 300 allows the user to upgrade memory via inserting additional cards. Alternatively, the user may use system memory in IP central and buffer data remotely.

Operating program store 330 may be configured to receive updates. This may be accomplished by having the user replace one or more memory cards or automatically by the IP central station downloading new operating code into one or more residential gateways 300.

As previously indicated, smart buffer logic (SBL) may be coupled to the telephony port(s) 332, data port(s) 334, TV port(s) 336, peripheral port(s) 342, and/or the distributed processing controller (DPC) 306. Where the smart buffer logic is utilized, it may function to buffer the IP packets for delivery over the communication network such as the hybrid fiber-coaxial plant 112. In addition, the smart buffer logic may include selectable switching and routing algorithms based on services and applications associated with each port. Depending on the destination of the IP traffic, the smart buffer logic may multiplex signal from various devices to effect faster information transfer. The smart buffer logic may also allow direct memory access between memory 322 and one or more of the devices and/or ports coupled to the high speed bus 360.

The telephony port(s) 332 may include various interface circuitry (e.g., analog interface, logic and firmware for interfacing with the Plain Old Telephone (POTs)

telephones). Also the telephony port(s) 332 may also be configured to include user interface logic, voice processing logic, voice activity detector logic, voice CODECs, and DTMF (dual tone multi-frequency) tone sensing logic. Echo cancellation and automatic gain control may also be utilized in the telephony port(s) 332 circuitry. In one embodiment, RJ-11 connectors for a plurality of lines (e.g., 4) are provided for connection to one or more existing plain old telephone system 110 telephone units. However, the broadband residential gateway 300 may contain any number of telephone connection ports. In this manner, any number of existing user phone may connected directly to the broadband residential gateway 300 without modification. Alternatively, the broadband residential gateway can be configured to support, in addition to or as alternative to the plain old telephone system telephone units, ISDN telephones and/or other digital phones (e.g., IP telephones) using an appropriate interface.

The data port(s) 334 interface may be variously configured. In one configuration, the data ports include high speed data service connections to, for example, a personal computer (PC) using a LAN connection. For example, the data ports 334 may include an Ethernet 802.3 connection compatible with category 5 unshielded twisted pair (UTP) cable and a RJ-45 connector. The data port(s) 334 may include the necessary interface circuitry for coupling to remote computers.

The TV port(s) 336 may include an interface for conventional television, HDTV and/or CATV services. The TV port(s) 336 typically have one or more F-connectors used for coaxial cable connection to a TV set(s). The TV ports may be configured to connect to a set top box (STB) via the F-connector or directly to a remote television. In embodiments where the settop box is co-located with the television, the data supplied over the TV ports may be either analog and/or digital information. Where the settop box is integrated into and/or comprises the broadband residential gateway 300, the TV ports may be analog or compatible with HDTV signals.

The broadband residential gateway 300 need not necessarily be limited to home use and is intended to also be utilized in business applications. In some configurations, the broadband residential gateway 300 may serve the same functions and operate as a private branch exchange (PBX). Where greater capacity is desired, one or more broadband residential gateways 300 may be disposed on a PC card and combined in a PC, rackmount, and/or server to create an expandable private branch exchange type system that enables intra-premises calling between telephones connected to various telephone connectors on the broadband residential gateway 300.

C. Integrated Broadband IP Based Communication System

Figure 4:
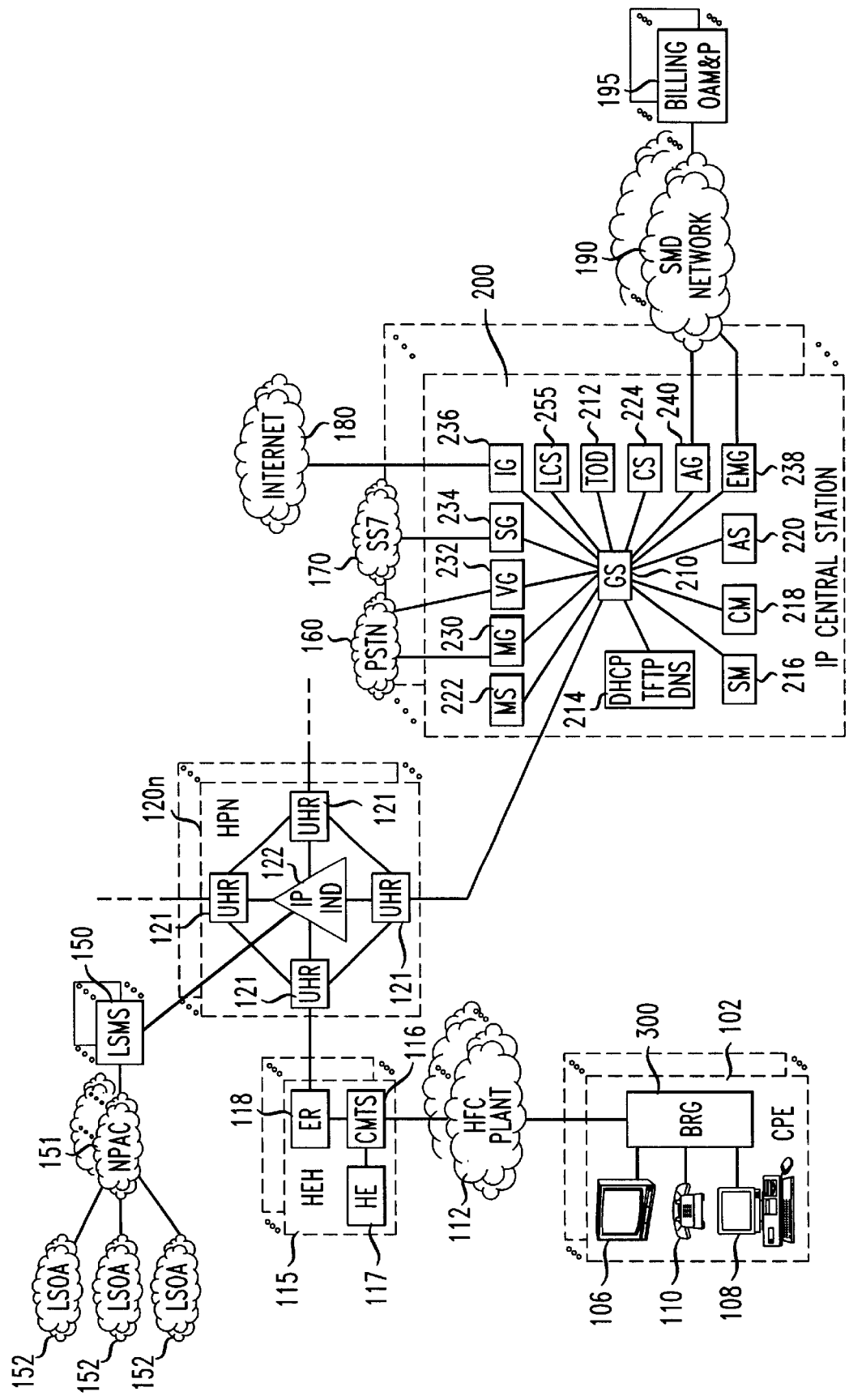
FIG. 4 shows a detailed schematic representation of an exemplary embodiment of the broadband network shown in FIG. 1.

FIG. 4 shows an exemplary embodiment of the broadband network 1 shown in FIGS. 1–3, with like components identified with identical numbers. At the extremities of the integrated communications system is the customer premises equipment unit (CPE) 102, e.g., one or more customer premise equipment 102 at each customer location. The customer premise equipment 102 may be configured to include an integrated communication interface device such as the broadband residential gateway 300. Other customer premise equipment 102 devices such as one or more televisions (TV) 106, personal computers (PC) 108, and telephones 110, etc., may be connected to the broadband residential gateway 300 via various ports as discussed above. The customer premise equipment 102 could include multiple TVs 106, telephones 110, and PCs 108 connected to a single and/or multiple broadband residential gateway 300. Further, in certain embodiments, it may be desirable to divide the broadband residential gateway 300 into more than one physical package. In this manner, certain interface circuitry may be located outside of the home while various processing circuitry may be located near a peripheral device such as in a settop.

Where the broadband residential gateway 300 is coupled to the hybrid fiber-coaxial plant 112 in accordance with a preferred embodiment of the present invention, it may be configured to provide the user with both information data (e.g., through an Ethernet interface), telephony access, and TV service (e.g., HDTV, Digital TV and/or CATV services). In exemplary embodiments, the hybrid fiber-coaxial plant 112 typically includes both coaxial cable and optical fiber networks, though, where desired, the network may include only coaxial cable or optical fiber. The hybrid fiber-coaxial plant 112 may be coupled to a head-end hub (HEH) 115. The head end hub 115 may provide an interconnection point to gather and/or transform external services (e.g., off air and satellite video, public switched telephone network voice, and Internet data) into a format suitable for distribution on the hybrid fiber-coaxial plant 112 for use with the customer premise equipment 102. The head-end hub 115 may include one or more cable modem termination systems (CMTS) 116 coupled between the hybrid fiber-coaxial plant 112, a Head-end (HE) 117 and/or an Edge Router (ER) 118. The edge router 118 may be coupled to the cable modem termination system 116 and to one or more ultra high speed routers (UHR) 121. One or more ultra high speed routers 121 may be interconnected to each other and/or through a centralized mechanism such as an IP network database to form a high speed network. The high speed packet network 120n is one example of the network 120 (e.g., IP network) shown in FIG. 1.

In the embodiment shown in FIG. 4, the high speed network 120n includes the ultra high-speed routers (UHR) 121 configured in a ring configuration. Although this embodiment shows the use of the IP network database (IND) 122, other configurations are also suitable. Where an IP network database 122 is utilized, it may be desirable to incorporate one or more data sets such as: a IP local number portability database (IP LNP) 122a which may be utilized for transferring local DN among service providers when a user changes their service provider; an IP caller name database (IP CNAME) 122b which may be utilized to provide a database of names relating to IP addresses and/or domain names; an IP line information database (IP LIDB) 122c which may provide alternative billing and allow flexibility in determining who pays for a call; and an IP 1-800 Database (IP 8YY) 122d which may provide a database of 1-800 numbers relating to the IP network 120a. Alternatively, the IP local number portability database may be located at another location, such as at an IP central station (IP Central) 130. Where desired, a local service management system (LSMS) 150 may be arranged to provide management of the IP local number portability database. Where a local service management system 150 is utilized, a plurality of local service order administration (LSOA) units 152 may be coupled to the local service management system by, for example, a number portability administration center (NPAC) 151. In this manner, directory numbers may be transported among different service providers. In such a case, a NPAC 151 is generally coupled to the LSMS 150 and uses the LSMS 150 to synchronize the numbering databases and to coordinate the porting process.

As indicated above, the broadband network 1 may include a plurality of interconnected high performance networks 120n. Each high performance network 120n may include a separate IP central station 200 and/or share a single IP central station. Having distributed IP central stations located throughout the broadband network 1 provides improved performance and quicker response time for an individual user. Although not illustrated, each high performance network 120, 120n may be connected to multiple head-end hubs 115, each head-end hub 115 may be connected to multiple hybrid fiber-coaxial plants 112, and each hybrid fiber-coaxial plant 112 may be connected to a plurality of customer premises equipment 102, each containing one or more broadband residential gateways 300. The plurality of high performance networks 120n may be configured as an interconnected network for routing packetized information from point-to-point in accordance with a desired destination.

The high performance network 120n may be configured to provide connectivity for and between a plurality of head-end hubs 115 and/or a plurality of broadband residential gateways 300 and other networks such as the Internet, e.g., www 180, the public switched telephone network (PSTN) 160 and/or various signaling systems such as the SS7 network 170 for end-to-end voice over IP applications. The IP central station 200 may be configured to provide seamless integration and control of the high performance network 120 (e.g., an IP based communication system) interface with the public switched telephone networks (PSTN) 160, signaling system seven (SS7) 170, and/or the Internet 180 so that packetized data, voice calls, and other signaling information is properly transferred between the broadband residential gateway 300 and the public switched telephone network 160 and Internet 180. In certain configurations, the hybrid fiber-coaxial 112, head-end hub 115, and high performance network 120, provide a signal conduit for packetized voice and data which may, with the coordination of the IP central station 200, be provided in the appropriate format between the broadband residential gateway 300, the public switched telephone network 160, and/or the www 180.

D. General Operation of Integrated Communication System

The typical home user is currently required to purchase multiple intelligent data conduits such as multiple set-top boxes, a plurality of conventional, DSL and/or ISDN phones, cable modems, HDTV receivers, satellite receivers, home PC LANs, etc. The integrated communication system of the present invention provides a user friendly versatile communication system that enables voice over IP telephony, information data (e.g., PC and Internet), and television services in a system with one intelligent customer premise equipment 102 interface, the broadband residential gateway 300. The broadband residential gateway 300 in conjunction with the IP central station 200 provides a flexible communication system that can provide any number of integrated communication service features and functions without requiring the user to become familiar with numerous, diverse types of equipment.

In one exemplary application of the voice over IP operations, the broadband residential gateway 300 digitizes the analog telephony signal using, for example, G.711 $\mu$ law coding (64 Kbps Pulse Code Modulation). The digital samples may then be packetized in, for example, the broadband residential gateway 300 into IP packets. The broadband residential gateway 300 may be configured to encapsulate the IP packets into, for example, DOCSIS (Data Over Cable Service Interface Specifications) frames for transmission back to the head-end hub (HEH) 115 over the hybrid fiber-coaxial plant 112. The hybrid fiber-coaxial plant 112 may then be configured to transport signals for both upstream (to head-end hub 202) and downstream (to the broadband residential gateway 300 and customer premise equipment 102) directions. Although the DOCSIS protocol is utilized in this example, any future protocol may also be used for the digitizing and packeting of data. Where the protocol changes, it may be desirable to download new operating code from, for example, IP central station 200 to the individual broadband residential gateways 300, to update the communication protocols dynamically. When new protocols are adopted, the IP central station may utilize, for example, the system management server 216 to download new protocol data into, for example, the protocol manager in the call manager 218 and the program store 330 in the broadband residential gateway 300.

Where voice packets are sent over constant bit rate (CBR) channels using unsolicited grants, additional packet data channels may be used to support signaling messages (e.g., SGCP, Simple Gateway Control Protocol), high-speed cable modem service and/or other upstream packet data services. The upstream packet data services may be sent using available bit rate (ABR) channels such that the voice channels not impacted by data traffic.

1. TV Signal Reception

The head-end 117 may originate CATV signals for transmission over the distribution network. However, in alternate embodiments, signals may be inserted at other points in the distribution network, such as at various hubs or may arise at remote locations in the network such as IP central. Down stream channels may be utilized to facilitate the transmission of signals from the head-end or other input distribution point to the subscriber premise. Where analog RF signals arrive at the broadband residential gateway 300 of the customer premise equipment 102, typically, the transceiver circuitry 302 will detect if the signal is addressed to this broadband residential gateway 300. If so, the transceiver will allow reception of the RF signal. Upon conversion to a digital format, the signal is typically output over the high speed bus (HSB) 360 to one or more associated devices for processing. For example, where the signal is a TV signal, the signal may be output directly to the TV port 336 and/or processed by the settop box 350 prior to outputting to the TV ports 336 and/or display 338. Where user channel selection is preformed directly in the broadband residential gateway 300, channel selection may be preformed by remote control receiver 365 using an external device such as a remote control. The remote control receiver may receive a plurality of individually coded remote control commands from different receivers and process the signals for only one associated device in accordance with the received commands. Alternative channel inputs include the display 338 and/or any associated keypad. Authorization to certain channels may be controlled by security processor 340.

Where a remote settop box is utilized, the box may be coupled directly to the HFC for individual frequency tuning and/or receive a digital feed from the broadband residential gateway 300 after decoding the digital signal. For example, where hybrid fiber-coaxial plant 112 contains fiber connections to locations near the individual homes, it may be desirable to download one or more simultaneous individually requested programming stream(s) and/or digital data stream(s) to the broadband residential gateway 300. In this manner, the number of channels, movie selections, and/or entertainment options available to the user are unlimited. Cost is minimized since only a single intelligent user interface is used in the home and all televisions, phones, computers, and/or other user interface devices use the same intelligent user interface to the broadband network 1. In this manner, the broadband network 1 may offer premium television, voice and/or data services to multiple conventional televisions, phones, and PCs without the use of multiple set boxes, modems, and external connections. Thus, the users are provided a single unified interface to satisfy their external data needs.

2. Exemplary Call Flow of an On-Network Call to an Off-Network Call, with the Off-Network Call Initiating the Dropping.

Figure 5:
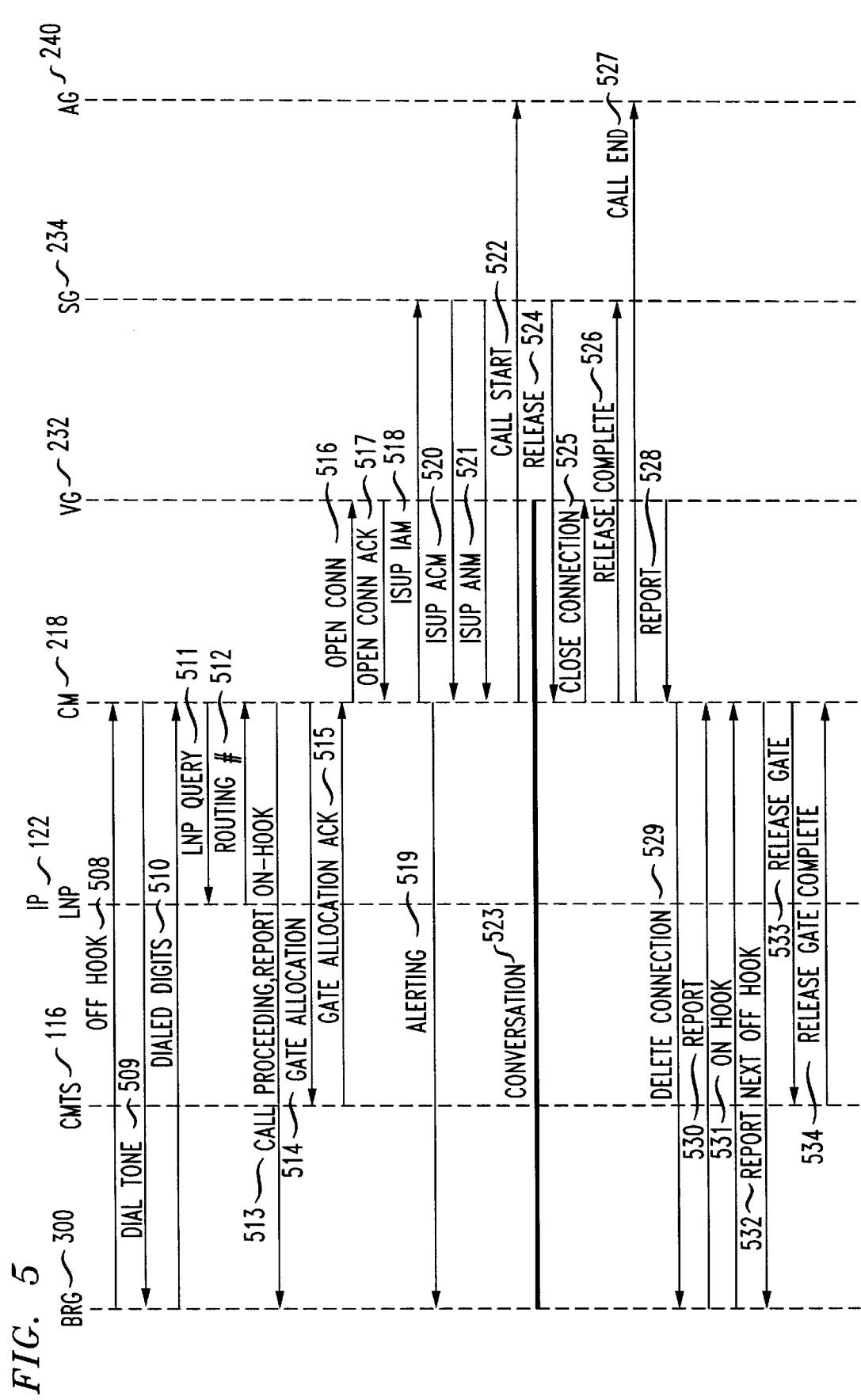
FIG. 5 is a signal flow diagram illustrating a typical on-network to off-network call according to one preferred method of operating the broadband network shown in FIG. 1.

FIG. 5 illustrates an exemplary call processing sequence for an on-net call (e.g., an IP based call) to an off-net call (e.g., a public switched telephone network based call), in which the off-net party initiates the drop call sequence. The exemplary call processing sequence operates as follows:

1. Once the broadband residential gateway 300 detects an off hook condition, the broadband residential gateway 300 may generate an off hook signal 508 to the call manager (CM) 218. The off hook signal acts as a dial tone request to the call manager 218. Alternatively, the broadband residential gateway 300 may collect all dialed digits before activating the off hook condition. This alternative may be desirable to save resources at the call manager 218 where multiple incoming lines are available to handle any additional calls. Thus, even though one phone is off-hook, the broadband residential gateway 300 determines that other lines are available and does not initiate the off-hook signal until all dialing digits have been collected.

2. Where the call is managed entirely by the call manager, the call manager 218 will issue a dial tone message 509 to the requesting broadband residential gateway 300 in order for the broadband residential gateway 300 to generate a dial tone to the associated phone. Where the broadband residential gateway 300 shares management of the call, the broadband residential gateway 300 generates the dial tone in response to the off-hook condition.

3. Where the call is managed entirely by the call manager 218, the call manager 218 will then enter a state where it polls and collects the dialed digits 510 from the broadband residential gateway 300. The dialed digits may then be transferred to the call manager 218 one at a time as they are entered. Alternatively, where the call set-up control process is shared between the broadband residential gateway 300 and the call manager 218, the broadband residential gateway 300 collects the dial digits and transfers these, together with the off-hook signal to the call manager 218. This transfer may be facilitated by combining this data into a single data packet.

4. On receiving the dialed digits, the call manager 218 will determine whether local number portability has been enabled. Where local number portability has been enable, the call manager 218 may issue a local number portability (LNP) query 511 to the IP local number portability database 122. The IP local number portability database 122 may then supply the call manager 218 with a routing number 512 if the dialed digits form a valid sequence. Where the dialed digits do not form a valid sequence, the call manager 218 will return an error indication to the broadband residential gateway 300. The error designation may include a tone and/or a more detailed error message for display on, for example, display 338.

5. Where the call sequence is valid, the call manager 218 may issue a first call proceeding message 513 to the broadband residential gateway 300 indicating that the number is valid and the call is proceeding (e.g., a valid on-hook condition).

6. Next, the call manager 218 typically determines whether adequate network resources are available to carry the call. In embodiments where the broadband residential gateway 300 is connected to a hybrid fiber-coaxial plant 112, the call manager 218 may send an open gate allocation request 514 to the cable modem transmission system 116. In this event, it is often desirable for the cable modem transmission system 116 to provide a gate allocation acknowledgement 515. A gate allocation acknowledgement may be utilized to verify that the necessary gate resources have been allocated.

7. The call manager 218 may send an open connection request 516 to the voice gateway (VG) 232 in order to provision the connection. Once the connection is provisioned, the VG 232 may provide an open connection acknowledgement 517 back to the call manager 218.

8. For off network connections, it is often necessary to enter a second phase of the connection process involving the appropriate link signaling to establish a call. For example, the call manager 218 may send an ISUP IAM (Initial Address) message 518 containing the directory number (DN) of the called party to the signaling gateway (SG) 234. This process is often utilized to allocate the appropriate voice trunk for communication. The call manager 218 may also send an lerting message 519 t the broadband residential gateway to produce an alerting signal, e.g., a ringing tone. The signaling gateway 234 may make the appropriate connections when the trunk has been allocated and acknowledge the request with an ISUP A call manager (Address Complete) message 520.

9. Once the called party has answered the call and connection is established, the signaling gateway 234 may send an ISUP ANM (Answered) message 521 to the call manager 218 indicating that the called party has answered.

10. The call manager 218 may then send a call start message 522 to the accounting gateway (AG) 240, indicating the start of the call. The AG 240 may use this information for billing purposes.

11. At this point, the link has been established and the conversation 523 can proceed over the communications path. Note that although signaling system 7 (SS7) signaling is used herein to illustrate the present invention and is a well known signaling protocol utilized in the art of telephony telecommunication, the instant invention is not limited to the use of signaling system 7 (SS7) signaling for call establishment of an off-network call; the use of signaling system 7 (SS7) signaling is merely illustrative. As such, other methods of signaling may be substituted for signaling system 7 (SS7).

11. When the called public switched telephone network user terminates the link, an on hook signal may be sent to the appropriate public switched telephone network switch, such as a 5ESS. The signaling network may then send a call termination message (not shown) to the signaling gateway 234 as notification of the call termination status.

12. The signaling gateway 234 may then generate a release 524 signal to the call manager 218.

13. Upon receipt of the release 524 signal, the call manager 218 may a) initiate the relinquishment of the provisioned network resources by issuing a close connection 525 message to the voice gateway (VG) 232 and a release complete 526 message to the signaling gateway 234, b) inform the accounting gateway that the call has been terminated, for billing purposes via, for example, sending a call end 527 message to the accounting gateway 240.

14. With reference to the close connection 525 message, the voice gateway may respond by issuing a report message 528 to the call manager 218 containing the current status of the call.

15. On receiving the call status report 528, the call manager 218 may issue a delete connection 529 message to the broadband residential gateway 300.

16. The broadband residential gateway 300 may then releases its resources and sends a status report 530 to the call manager 218. In addition to the report 530, the broadband residential gateway 300 may also send an on hook 531 status report to the call manager 218.

17. The call manager 218 may then inform the broadband residential gateway 300 to report the next off hook condition via message 532.

18. Where a cable modem transmission system is utilized, the call manager 218 may then issues a release gate 533 message to the cable modem transmission system 116 so that all the modem resources can be relinquished. Once the gate resources have been released, the cable modem transmission system 118 sends a release gate complete 534 message to the call manager 218. At this point, all resources pertaining to the call have been relinquished.

Figure 6:
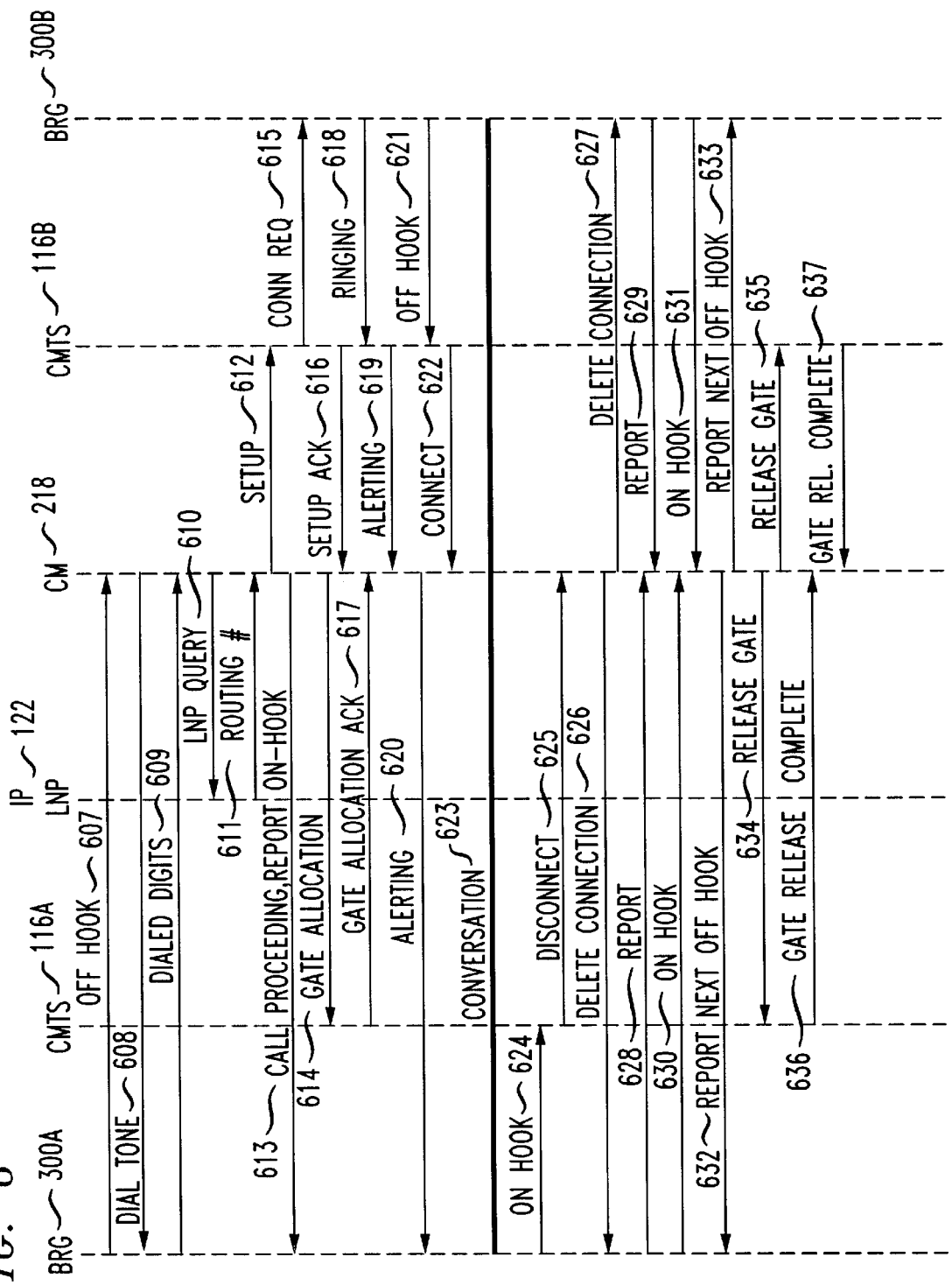
FIG. 6 is a signal flow diagram illustrating a typical on-network to on-network call according to one preferred method of operating the broadband network shown in FIG. 1.

3. Exemplary Call Flow of an On-Network Call to another On-Network User, under One Call Manager Control FIG. 6 illustrates an exemplary call flow of an on-network call to another on-network user, with the call being handled by a single call manager (CM) 218. In alternate embodiments, different portions of the call set-up sequence may be handled by more than one call manager 218 in the IP network 120. The exemplary "on-network" call processing sequence operates as follows:

1. Once the broadband residential gateway 300A detects and off hook condition of, for example, a telephone, the broadband residential gateway 300A may generate an off hook signal 607 to the call manager (CM) 218. The off hook signal may act as a dial tone request to the call manager 218.

2. The call manager 218 may then issue a dial tone message 608 to the requesting near-side broadband residential gateway 300A in order for the broadband residential gateway 300A to generate a dial tone.

3. The call manager 218 may then enter a state where it polls and collects the dialed digits 609 from broadband residential gateway 300A. The dialed digits are transferred to the call manager 218 one at a time. In a similar fashion to the subject matter discussed above, in embodiments where the call setup is shared between the call manager 218 and the broadband residential gateway 300A, the broadband residential gateway may manage the call set-up and transfer both the off-hook signal and the dialed digits to the call manager 218 within one or more.

4. On receiving the completed dialed digits, the call manager 218 may issue a local number portability query 610 to the IP local number portability database 122. The IP local number portability database 122 may then supply the call manager 218 with a routing number 611 if the dialed digits constitute a valid sequence.

5. The call manager 218 may then ensure that adequate network resources are available to accommodate the call.

6. Where adequate resources are available, the call manager 218 may issue a first setup message 612 to whatever mechanism couples the far side broadband residential gateway 300, e.g., the cable modem transmission system 116B, to allocate transmission resources on the far side.

7. A call proceeding message and a report on hook condition message 613 may then be sent to the broadband residential gateway 300A.

8. A gate allocation message 614 may then be sent from the call manager 218 to the cable modem transmission system 116A, where the broadband residential gateway 300A is coupled via a cable modem transmission system. In this environment, a gate allocation 614 message may be utilized to set up the relevant modem resources.

9. Where a cable modem transmission system is utilized and receives the setup message 612 from call manager 218, the cable modem transmission system 116B may then send a connection request 615 message to the far side broadband residential gateway 300B.

10. Where a cable modem transmission system 116B is utilized, the cable modem transmission system may then sends a setup acknowledgement 616 to call manager 218. Once the resources are allocated by the cable modem transmission system 116A, the cable modem transmission system may then send a gate allocation acknowledgement message 617 back to the call manager 218.

11. Once the call manager 218 receives the setup acknowledgement 616 along with the gate allocation acknowledgement message 617, the far-side broadband residential gateway 300B may then send a ringing message 618 to the far-side cable modem transmission system 116B where this connectivity is utilized.

12. In these embodiments, the far-side cable modem transmission system 116B may then issue an alerting message 619 to the call manager 218.

13. The call manager 218 may then convey the alert via an alerting message 620 to the broadband residential gateway 300A, to produce a indicating signal sich as a ringing signal indicating that the call is going through.

14. The cable modem transmission system 116B may then issue a connect message 622 to the call manager 218 in response to the far-side broadband residential gateway 300B sending an off hook message 621 to the far-side cable modem transmission system 116B. At this point, the end-to-end communication path is established and conversation 623 can be facilitated.

15. Assuming that the calling party hangs up first, the broadband residential gateway 300A may initiate an on hook sequence 624 message which may be communicated to the near-side cable modem transmission system 116A.

16. The cable modem transmission system 116A may then issue a disconnect message 625 to the call manager (CM) 218. The call manager 218 may then issue a first delete connection request 626 to the near-side broadband residential gateway 300A and then a second delete connection request 627 to the far-side broadband residential gateway 300B.

17. The near-side broadband residential gateway 300A may respond to the call manager 218 with a report message 628 containing the connection status, as well as an on hook message 630 to verify that the calling party at near-side broadband residential gateway 300A has terminated the call.

18. The far-side broadband residential gateway 300B may respond to the call manager 218 with a report message 629 containing the connection status, as well as an on hook message 631 indicating that the called party connection has now been terminated.

19. At this point, the call manager 218 may issue release gate messages 634 and 635 to the near-side cable modem transmission system 218 and far side cable modem transmission system 116B, respectively, so as to release the modems associated with the call. Once all the resources have releases, the cable modem transmission system 116A and the cable modem transmission system 116B may issue gate release complete messages 636 and 637 respectively to the call manager 218.

20. For simplicity, the accounting processing is not shown. However, the process used in FIG. 5 may be utilized as the billing procedure for on-net calls. Such a process might constitute sending a call start message from the call manager 218 to an accounting gateway (AG) 240 after the connect message 622 is sent from the far-side cable modem transmission system 116B to call manager 218. The call start message would trigger the start of the billing procedure. A corresponding call end message would then be sent from the call manager 218 to the AG 240 after the near-side cable modem transmission system 116A sends a the disconnect message 625 to the call manager 218. This call end message would trigger the ending of the billing procedure for that call.

Although the IP voice packets for these calls are typically routed over the IP network 120, the system may, where appropriate, route IP voice packets over the Internet 180.

II. Personal IP Follow-Me Service

According to one embodiment of the present invention, the roaming subscriber may receive forwarded incoming phone calls anywhere that IP telephony service is available. When the subscriber arrives at a residential or public telephone station, the subscriber dials a toll-free number for location registration using either a PIN or some other personal information that uniquely identifies the subscriber. The network then automatically maps the telephone's location information with the directory number (DN) the caller wants to be forwarded. The directory number could be for the caller's home telephone, office telephone, etc. This feature is called "automatic location registration."The location information is stored in a database by the Call Manager and the caller's home base directory number is flagged by the Call Manager. Alternatively, the automatic location registration control can be performed by other devices in the telephony system, for example, the Broadband Residential Gateway.

Figure 7:
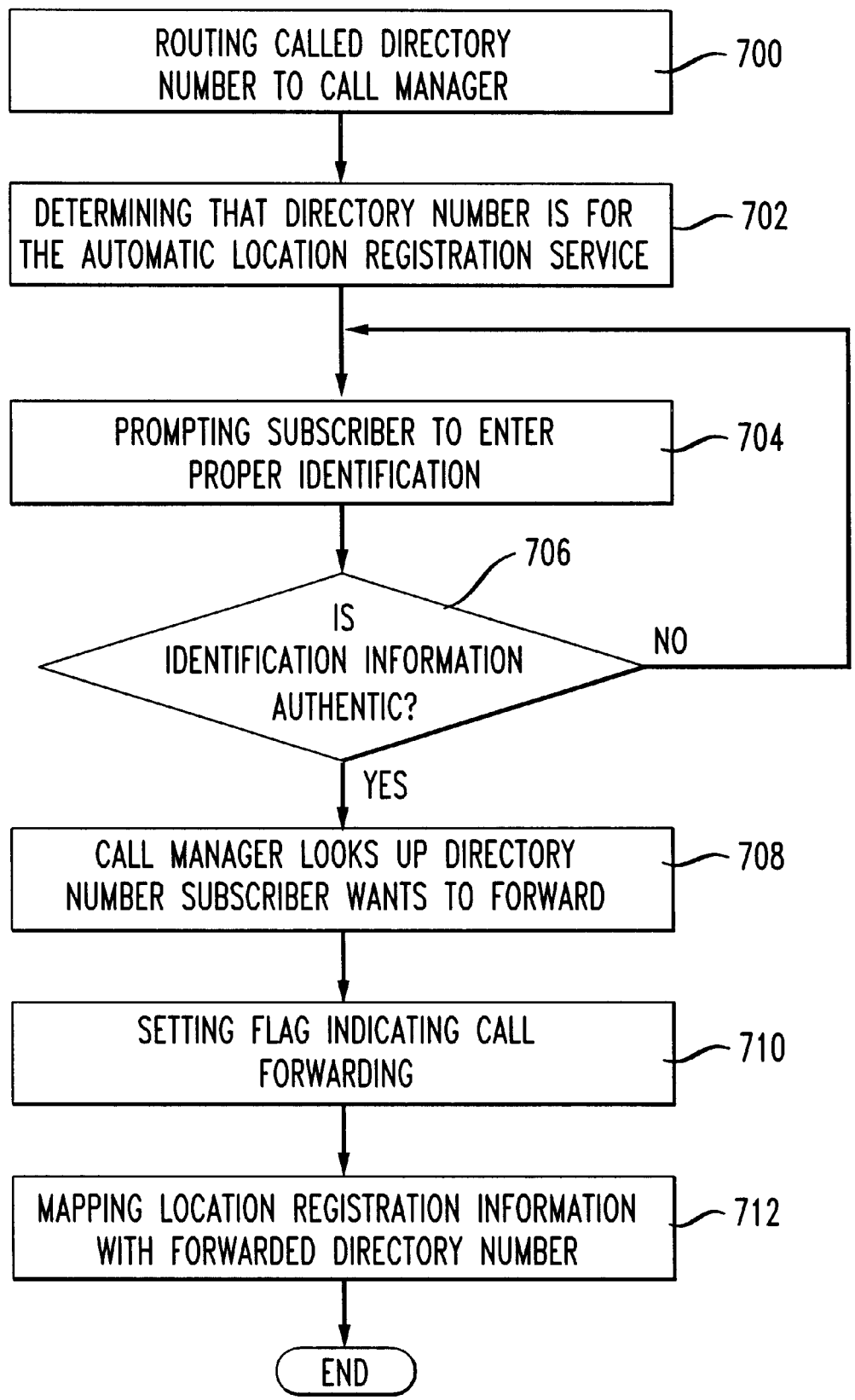
FIG. 7 is a flow chart which illustrates a call forward follow-me service according to one embodiment of the present invention.

As illustrated in FIG. 7, the called directory number is sent to the Call Manager in step 700. The Call Manager then determines that the called directory number is for the automatic location registration service in step 702. The Call Manager then causes the subscriber to be prompted to enter proper identification information in step 704. After authenticating the identification in step 706, the Call Manager looks up the directory number the subscriber wants to have forwarded in step 708. The Call Manager flags the directory number in step 710 and maps the location information of the telephone the subscriber used for location registration with the directory number and stores the mapped information in a database in step 712. Optionally, the Call Manager can then send a message back to the subscriber (synthezised speech, text, tone) informing the subscriber that the call forwarding feature has been activated.

When a call arrives at the Call Manager destined for the subscriber's home base directory number, the Call Manager first checks the received directory number to see if it has been flagged. If the directory number has been flagged, the Call Manager access the database to retrieve the stored location information. The Call Manager then redirects the call to the new location using the stored location information.

Figure 8:
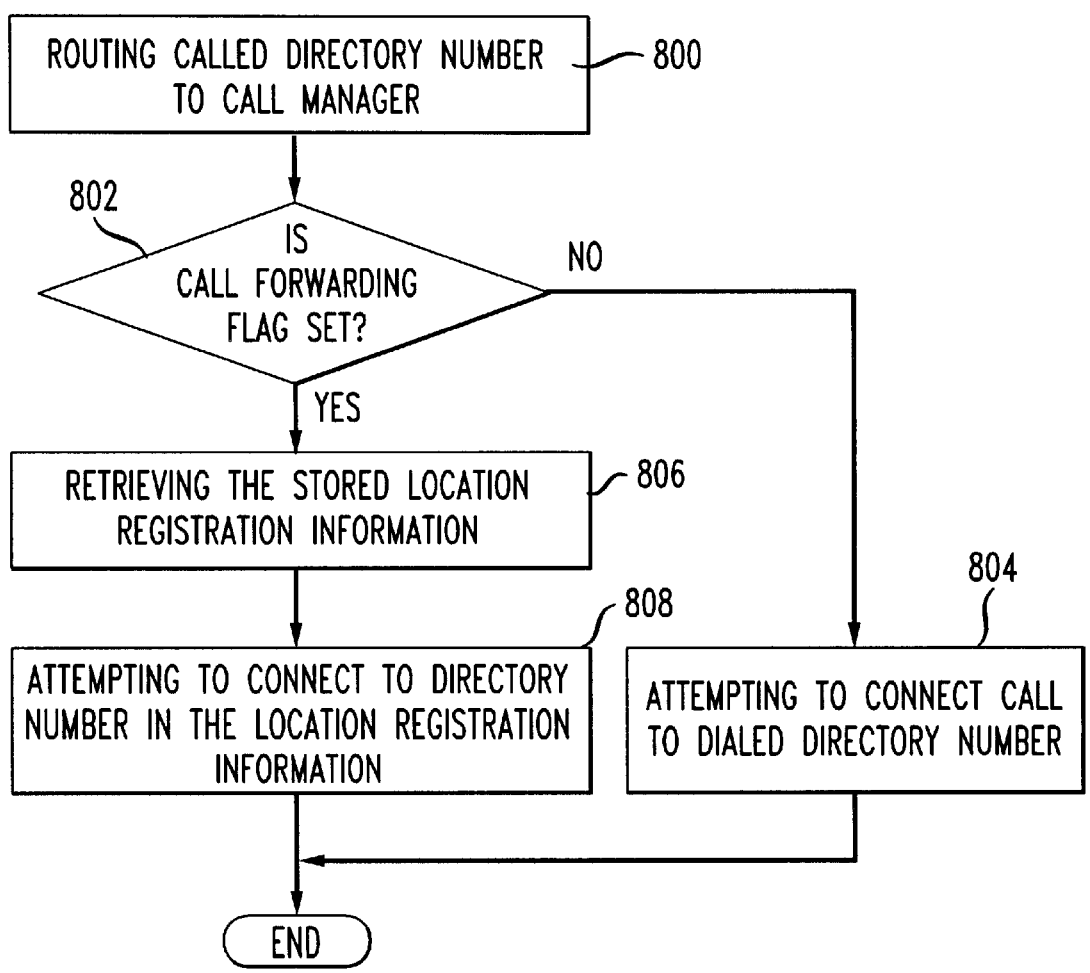
FIG. 8 illustrates call forwarding of a call according to one embodiment of the present invention.

FIG. 8 will now illustrate the call forwarding of a call for telephone DN1 using stored location registration information. When DN1 is dialed, the directory number is routed to the Call Manager in step 800. For calls initiated On-Net, the DN1 is routed to the Call Manger as illustrated in FIG. 5. For calls initiated Off-Net, the DN1 is routed to the Call Manager from, for example, the PSTN 160 through the Voice Gateway 232 or Multimedia Gateway 230 or from the Internet 180 through the Internet Gateway 236, but the invention is not limited thereto. Once the DN1 is received by the Call Manager, the Call Manager checks to see if the DN1 has been flagged for call forwarding in step 802. If DN1 has not been flagged, the call is connected to DN1 in step 804 using, for example, the processes illustrated above with respect to FIGS. 5 and 6. However, if the DN1 has been flagged, the Call Manager retrieves the location information mapped to DN1 which has been stored in a database in step 806. The Call Manager then attempts to connect the call to the directory number in the location information in step 808 using, for example, the processes illustrated above with respect to FIGS. 5 and 6.

Optionally, an alerting parameter in the call delivery message may be used to instruct the called Broadband Residential Gateway (BRG) to generate a distinctive ringing tone on the forwarded phone to notify the subscriber that the call is a forwarded call and not a call originally directed to the forwarded phone. The alerting parameter is inserted into the call delivery message by the Call Manager.

Automatic location registration may also be used to provide a "follow-me" feature. For example, a roaming subscriber uses his/her login ID and password for data access at a location other than the subscriber's home base DN. Responsive to receiving the information entered by the subscriber, the Call Manager may perform automatic location registration functions. The Call Manager can determine both the current IP location of the subscriber as well as the identity of the subscriber automatically in response to receiving the information from the subscriber. If an IP telephony port is available, subsequent calls may be automatically routed to a new location.

The following copending U.S. Patent applications, originally filed the same day as the present application, are hereby incorporated by reference:

1. U.S. patent application Ser. No. 09/475,167, entitled "Automatic Port Status Reporting and Selective Call Barge-in For a Broadband Voice Over IP Telephony System and Method" invented by Kung et al.
2. U.S. patent application Ser. No. 09/475,140, entitled "Automatic Cable Phone Service Activation," invented by Kung et al.

3. U.S. patent application Ser. No. 09/475,141, entitled "Broadband Cable Telephony Network Architecture IP ITN Network Architecture Reference Model," invented by Kung et al.
4. U.S. patent application Ser. No. 09/475,142, entitled "IP Conference Call Waiting" invented by Kung et al.
5. U.S. patent application Ser. No. 09/475,143, entitled "Conference Server for Automatic X-Way Call Port Expansion Feature", invented by Kung et al.
6. U.S. patent application Ser. No. 09/475,197, entitled "Wireless Touch Screen Television," invented by Kung et al.
7. U.S. patent application Ser. No. 09/475,195, entitled "Programmable Feature Buttons on a Broadband Residential Gateway," invented by Kung et al.
8. U.S. patent application Ser. No. 09/475,745, entitled "Automatic Call Manager Traffic Gate Feature," invented by Kung et al.
9. U.S. patent application Ser. No. 09/475,201, entitled "Local Number Portability Database for On-net IP Call," invented by Kung et al.
10. U.S. patent application Ser. No. 09/475,194, entitled "Personal IP Toll-Free Number," invented by Kung et al.
11. U.S. patent application Ser. No. 09/475,196, entitled "User Programmable Port Hunting in an IP Based Customer Premise Equipment," invented by Kung et al.
12. U.S. patent application Ser. No. 09/475,146, entitled "IP Leased Line," invented by Kung et al.
13. U.S. patent application Ser. No. 09/475,160, entitled "Anonymous Call Rejection," invented by Kung et al.
14. U.S. patent application Ser. No. 09/475,161, entitled "Automatic Callback With Distinctive Ringing," invented by Kung et al.
15. U.S. patent application Ser. No. 09/475,162, entitled "IP Multimedia Call Blocking," invented by Kung et al.
16. U.S. patent application Ser. No. 09/475,144, entitled "IP Call Forward Profile," invented by Kung et al.
17. U.S. patent application Ser. No. 09/475,671, entitled "IP Call Forward Follow Me," invented by Kung et al.
18. U.S. patent application Ser. No. 09/475,670, entitled "Enhanced BRG with Display Capabilities," invented by Kung et al.
19. U.S. patent application Ser. No. 09/475,672, entitled "Hand Held Integrated IP Device," invented by Kung et al.
20. U.S. patent application Ser. No. 09/475,292, entitled "Wireless Settop Box," invented by Kung et al.
21. U.S. patent application Ser. No. 09/475,145, entitled "BRG PCMCIA Card Cable Ready for PCs," invented by Kung et al.
22. U.S. patent application Ser. No. 09/476,494, entitled "Broadband Service Access," invented by Kung et al.
23. U.S. patent application Ser. No. 09/475,798, entitled "Method for Providing Broadband Public IP Services," invented by Kung et al.
24. U.S. patent application Ser. No. 09/475,797, entitled "Method For Billing IP Broadband Subscribers," invented by Kung et al.
25. U.S. patent application Ser. No. 09/475,165, entitled "BRG With PBX Capabilities," invented by Kung et al.
26. U.S. patent application Ser. No. 09/475,783, entitled "Enhanced IP Subscriber Alerting," invented by Kung et al.
27. U.S. patent application Ser. No. 09/475,782, entitled "Chase Me System," invented by Kung et al.
28. U.S. patent application Ser. No. 09/475,673, entitled "Call Hold With Reminder and Information Push," invented by Kung et al.
29. U.S. patent application Ser. No. 09/475,293, entitled "Activity Log For Improved Call Efficiency," invented by Kung et al.
30. U.S. patent application Ser. No. 09/475,779, entitled "Selective Information Admission," invented by Kung et al.
31. U.S. patent application Ser. No. 09/475,166, entitled "User Programmable Fail-proof IP Hotline/Warm-line," invented by Kung et al.
32. U.S. patent application Ser. No. 09/476,493, entitled "Authentication of Broadband IP Telephony Service," invented by Kung et al.
33. U.S. patent application Ser. No. 09/475,667, entitled "Simplified IP Service Control," invented by Kung et al.
34. U.S. patent application Ser. No. 09/475,206, entitled "Personal Control of Address Assignment & Greeting Options for Multiple BRG Ports," invented by Kung et al.
35. U.S. patent application Ser. No. 09/475,661, entitled "Protected IP Telephony Calls Using Encryption (P.I.E-Protected IP Encryption)," invented by Kung et al.
36. U.S. patent application Ser. No. 09/475,294, entitled "Integrated Multimedia Messaging Service," invented by Kung et al.
37. U.S. patent application Ser. No. 09/475,666, entitled "Remote Monitoring Through the BRG," invented by Kung et al.
38. U.S. patent application Ser. No. 09/475,296, entitled "Cable Headend System with Pseudo-Switching Capabilities," invented by Kung et al.
39. U.S. patent application Ser. No. 09/475,287, entitled "A Method for Performing Roaming Across Multiple IP networks," invented by Kung et al.
40. U.S. patent application Ser. No. 09/475,662, entitled "Scalable VoIP network Server For Low Cost PBX," invented by Kung et al.
41. U.S. patent application Ser. No. 09/475,288, entitled "Call Services Transfer," invented by Kung et al.
42. U.S. patent application Ser. No. 09/475,204, entitled "Multiple Call Waiting in a Packetized Communication System," invented by Kung et al.
43. U.S. patent application Ser. No. 09/475,205, entitled "Optimizing Voice Paths in an IP Telephony Network," invented by Kung et al.
44. U.S. patent application Ser. No. 09/475,203, entitled "Call Waiting and Forwarding in a Packetized Communication System," invented by Kung et al.
45. U.S. patent application Ser. No. 09/475,202, entitled "Incoming Call Identification in IP Telephony," invented by Kung et al.
46. U.S. patent application Ser. No. 09/475,290, entitled "Incoming IP Call Remote Party Data," invented by Kung et al.
47. U.S. patent application Ser. No. 09/475,295, entitled "Personal User Network (Closed User Network) PUN, CUN," invented by Kung et al.
48. U.S. patent application Ser. No. 09/475,668, entitled "IP Address Interworking Unit (IAIU) For Automatic IP V4 to V6 Address Translation," invented by Kung et al.
49. U.S. patent application Ser. No. 09/475,669, entitled "Automatic Off-Hook Recovery and Fail-Proof Call Delivery," invented by Kung et al.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

We claimed:

1. A method for providing a follow-me call forwarding service in an IP telephone network, comprising the steps of:
   determining when a subscriber uses an assigned code for data access at a new location which is different from the subscriber's directory number;
   identifying the directory number of the subscriber's new location;
   identifying the subscriber from said assigned code;
   automatically mapping the directory number of the subscriber's new location with a stored directory number, said stored directory number corresponding to the subscriber's directory number;
   routing a voice call originally for the subscriber at the subscriber's directory number to the directory number of the subscriber's new location, said routing comprising sending IP data packets to the subscriber's new location, the IP data packets being associated with digital samples of said call.

2. The method according to claim 1, wherein the assigned code comprises a login identification code and a password.

3. A system for providing a follow-me call forwarding service in an IP telephone network, comprising:
   means for determining when a subscriber uses an assigned code for data access at a new location which is different from the subscriber's directory number;
   means for identifying the directory number of the subscriber's new location;
   means for identifying the subscriber from said assigned code;
   means for automatically mapping the directory number of the subscriber's new location with a stored directory number, said stored directory number corresponding to the subscriber's directory number; and
   means for routing a voice call originally for the subscriber at the subscriber's directory number to the directory number of the subscriber's new location, said routing comprising sending IP data packets to the subscriber's new location, the IP data packets being associated with digital samples of said call.

4. The system according to claim 3, wherein the assigned code comprises a login identification code and a password.

5. The method of claim 1 wherein said routing further comprises encapsulating said IP data packets into DOCSIS frames.

6. The system of claim 3 wherein said routing further comprises encapsulating said IP data packets into DOCSIS frames.

* * * * *